March 15, 1966 C. W. AHMER 3,239,941

LOCATOR AND MARKER

Filed June 5, 1961 10 Sheets-Sheet 1

INVENTOR.
Carl W. Ahmer
BY Horton, Davis, Brewer & Brugman
Attys.

March 15, 1966 C. W. AHMER 3,239,941

LOCATOR AND MARKER

Filed June 5, 1961 10 Sheets-Sheet 2

INVENTOR.
Carl W. Ahmer
BY Horton, Davis, Brewer & Brugman
Attys.

INVENTOR.
Carl W. Ahmer
BY Horton, Davis
Brewer + Brugman
Attys.

March 15, 1966 C. W. AHMER 3,239,941

LOCATOR AND MARKER

Filed June 5, 1961

10 Sheets-Sheet 4

INVENTOR.
Carl W. Ahmer
BY Horton, Davis,
Brewer & Brugman
Att'ys.

March 15, 1966 C. W. AHMER 3,239,941

LOCATOR AND MARKER

Filed June 5, 1961 10 Sheets-Sheet 5

INVENTOR.

Carl W. Ahmer

BY Horton, Davis, Brewer + Brugman

Attys.

INVENTOR.
Carl W. Ahmer
BY Horton, Davis, Brewer & Brugman
Att'ys.

INVENTOR.
Carl W. Ahmer
BY Horton, Davis, Brewer + Brugman
Att'ys.

March 15, 1966 C. W. AHMER 3,239,941

LOCATOR AND MARKER

Filed June 5, 1961 10 Sheets-Sheet 8

INVENTOR.

Carl W. Ahmer

BY Horton, Davis, Brewer + Brugman

Att'ys.

LOCATOR AND MARKER

Filed June 5, 1961

INVENTOR.
Earl W. Ahmer
BY Horton, Davis,
Brewer & Brugman
Att'ys

INVENTOR.
Carl W. Ahmer
BY Horton, Davis,
Brewer & Brugman
Attys.

3,239,941
LOCATOR AND MARKER

Carl W. Ahmer, 1321 Hillside Road, Northbrook, Ill.

Filed June 5, 1961, Ser. No. 114,977
26 Claims. (Cl. 33—189)

The present invention relates to a device for locating points, and marking locations, on a workpiece, for use in performing operations on it such as drilling holes and may be referred to as a hole locator.

In the building and construction of various devices such as machines, it is essential that the locations of post-formed holes and other conformations in the parts be accurately marked. Heretofore, the most common method of marking such locations has been to determine the location by visual observation and thereupon making a mark by a manual operation; for example, assuming that a workpiece such as a side plate were to have a number of holes drilled therein at exact locations, the operator, in order to mark the locations for these holes, would determine the locations or points according to calculations or measurements from side margins of the workpiece, and then mark those locations by means of a hand punch and hammer. Error is apt to occur in the measuring operations, even when performed by a skilled operator, and error is also apt to occur in the technique of performing the punching operation, because the operator cannot always determine by visual observation whether the point of the punch is exactly positioned where desired. Even though error may be substantially eliminated among the more skilled operators in the foregoing method, that method is extremely time consuming and for that reason an extremely expensive operation.

In the use of the device of the present invention the possibility of error mentioned is entirely and definitely eliminated, and the operation of determining the locations of the holes, and marking those locations, is extremely rapid and moreover the use of the device requires a minimum of skill.

A broad object therefore is to provide a novel device for locating positions for working operations in a workpiece and marking those locations.

Another and relatively broad object is to provide a device of the character noted above having a table top or bed, upon which the workpiece is placed, provided with coordinate guides or zero locator abutments along two sides for positioning the workpiece relative to the zero coordinates in each of mutually transverse directions, and including a marker mounted on the device for movement over the bed, and hence over the workpiece on the bed, for use in marking on the workpiece exact locations as determined with reference to the zero coordinates.

A further object is to provide a device of the general character noted above having a marking element supported by carriages mounted for movement along respective coordinate lines, in which is provided novel means for mounting the carriages on arms along which they move, in accurate position and against tendency to angular movement about the longitudinal axes of the arms.

Another object is to provide a device of the character noted having a bed for supporting a workpiece and zero coordinate guides along two sides of the bed, and a marker supported by mutually transversely movable carriages for moving the marker to any location on the bed, in which the marker may be quickly moved for rough location and thereafter adjusted in micrometric increments for accurate location thereof.

Another object of the invention is to provide a device of the foregoing general character in which the position of the marking device relative to the zero coordinates is indicated by visual indicating means other than the marking element thereof, and in which this indicating means produces an amplified indication.

A further object is to provide a device of the character just noted in which the indicating means is in the form of a direct reading scale.

A further object is to provide in a device of the general character noted above, a bed for supporting a workpiece and zero coordinate guides along two sides of the bed and a marker positionable over the bed for use in locating and making markings relative to said zero coordinate guides, and an extension adaptable to the device having a zero coordinate guide for use in substitution for one of the zero coordinate guides on the bed, at such position relative to the bed that the workpiece may be shifted to different positions and the locations and markings may be made at repeated equal-increment portions along the workpiece, whereby to produce an effective length of the device greater than that of the bed itself.

Another object is to provide a device of the character just noted having carriages supporting a marking element for movement of the latter over the bed, and dials operable for indicating the position of the marking element, wherein the dials are actuated in response to and proportionately to movement of the carriages, and including means for adjusting the carriages to accurate positions for correspondingly accurately positioning the marking element, in which the indicating dials provide an accurate indication of the position of the marking element.

Another object is to provide a device of the character just noted including means for indicating the position of the marking element relative to the bed in which simple and effective means is provided for determining the accuracy of the indicating means and for making any necessary compensating adjustments therein.

A further object is to provide a screw arrangement for making micrometric adjustment, having novel means for preventing backlash in the screw means.

Still another object is to provide a device of the general character noted above which is extremely versatile and particularly in the fact that a workpiece may be universally positioned for determining and marking locations thereon on any and all of its six sides.

A more specific object is to provide a device of the character just noted having novel means for positioning the workpiece at different positions for utilizing a single marking element and related structure, for determining and marking locations on any of the six sides of the workpiece.

A still more specific object is to provide a device of the character just noted which includes a basic device having a bed for placing a workpiece thereon whereby it may be positioned, for example, for placing each of opposite faces upwardly, together with special attachments that may be readily applied and removed from the basic device, for supporting a workpiece at the side of the bed for presenting, for example, a narrow edge surface upwardly adjacent the top surface of the bed and in position for engagement by a marking implement disposed over the bed.

Still another object is to provide a quick locking means for clamping a workpiece to the device.

A further object is to provide a device of the general character noted particularly effective for accommodating irregularly shaped pieces.

Other objects and advantages of the invention will appear from the following detailed description taken in conjunction with the accompanying drawings in which.

Figures 4, 7:
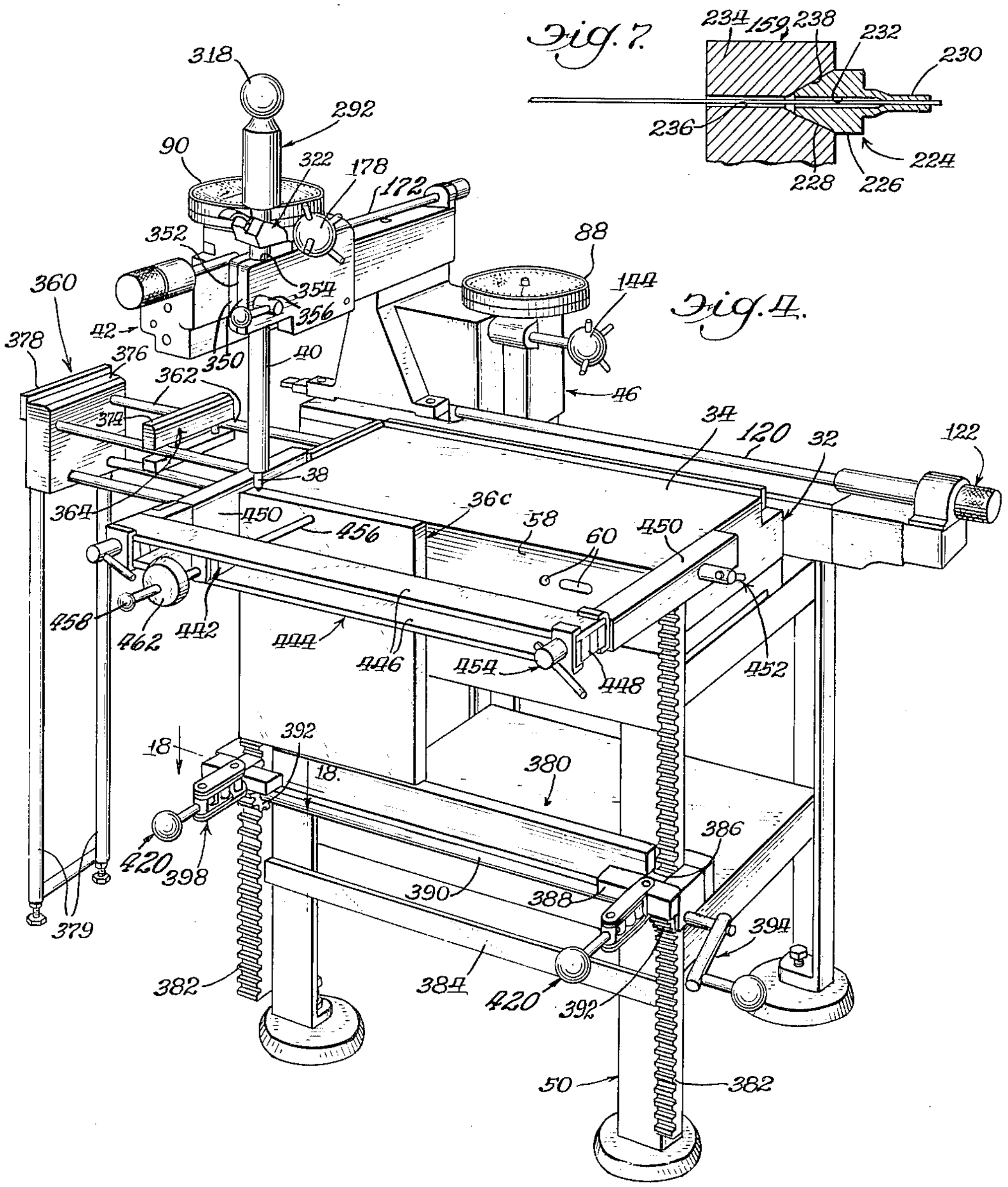
FIG. 4 is a perspective view similar to FIG. 1, but showing the special attachments thereon, and showing the marking element or center punch in a different location relative to FIG. 1.
FIG. 7 is a detailed sectional view of one end portion of the device of FIG. 5 and its relation to the mounting means therefor.
Figure 15:
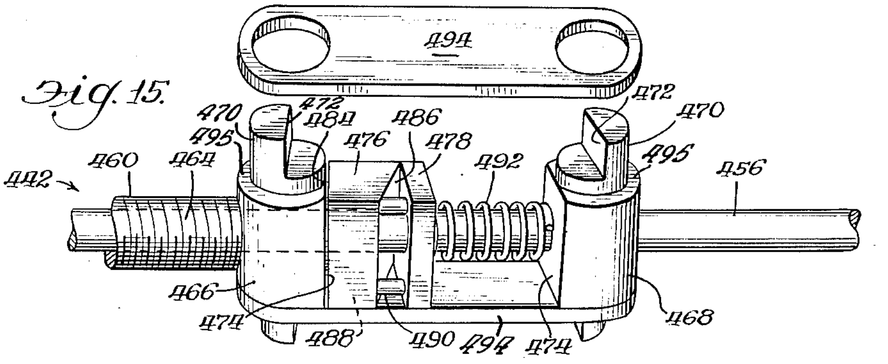
FIG. 15 is a perspective exploded view of a portion of the novel means for quick-locking a workpiece at the side of the bed.
Figures 19, 20:
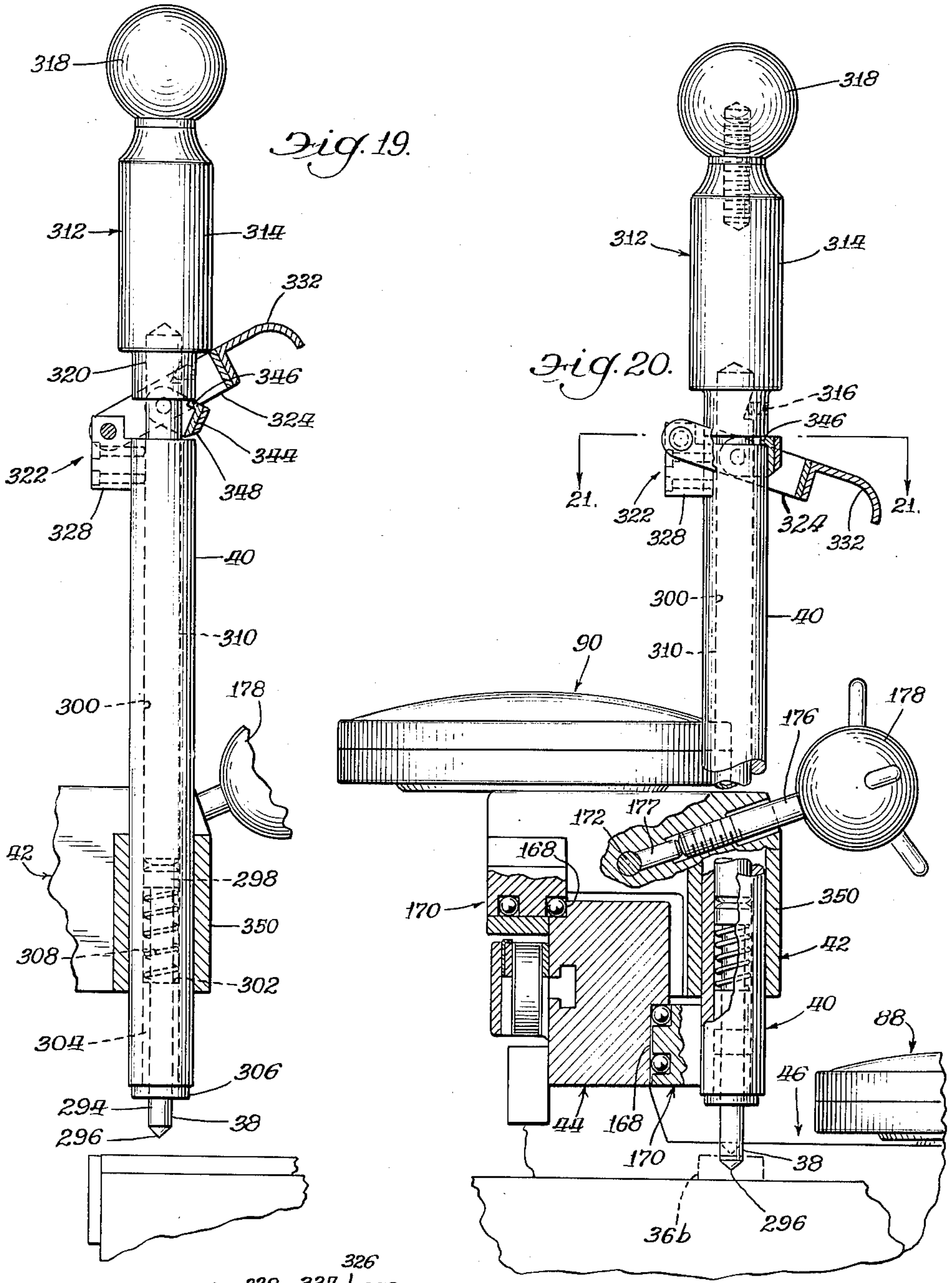
FIG. 19 is a view of the center punch and the spindle therefor.
Figure 21:
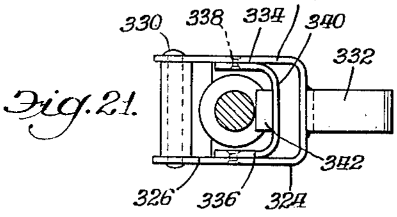
Figure 22:
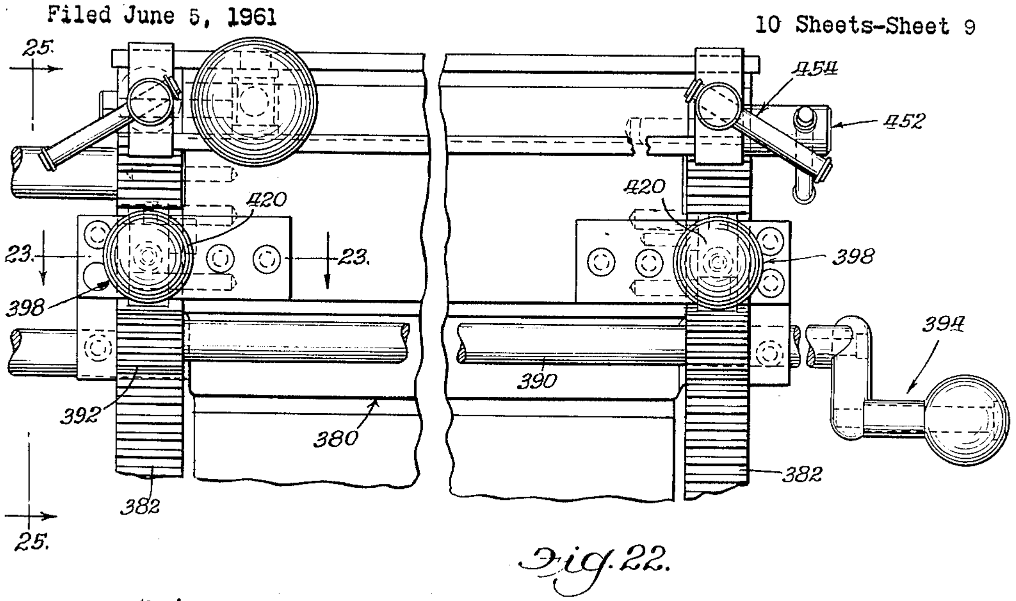
Figure 23:
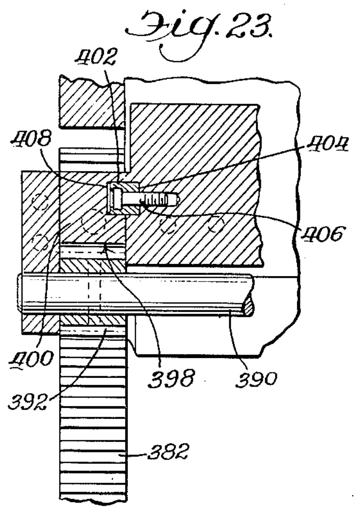
Figure 24:
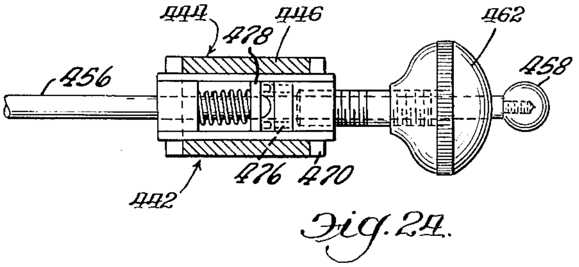
Figure 25:
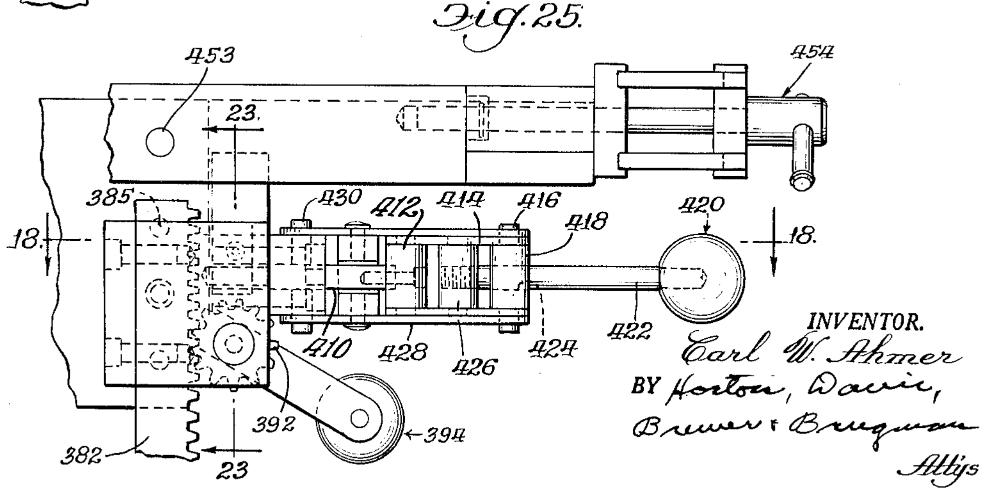
Figure 26:
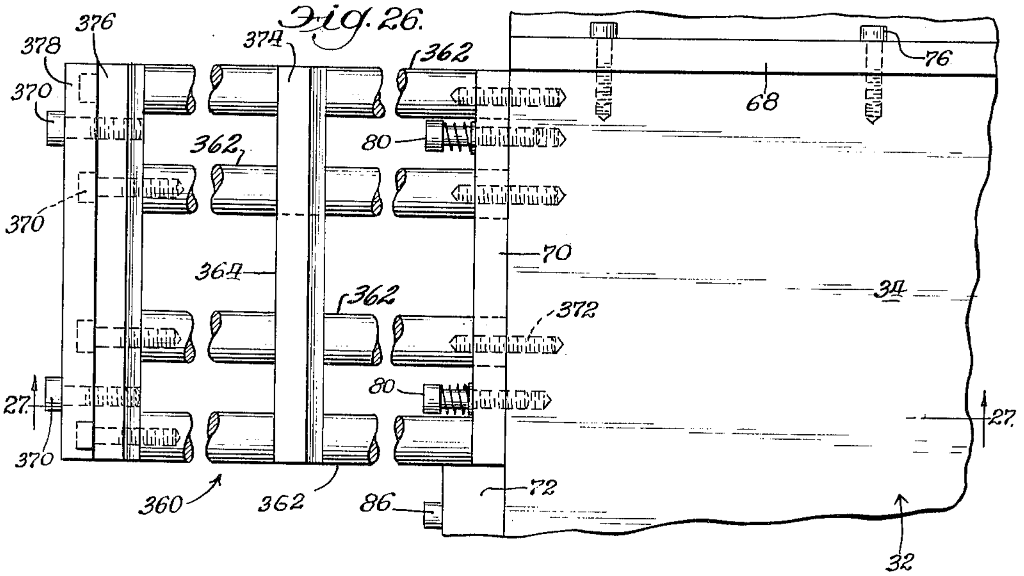
Figures 27, 28:
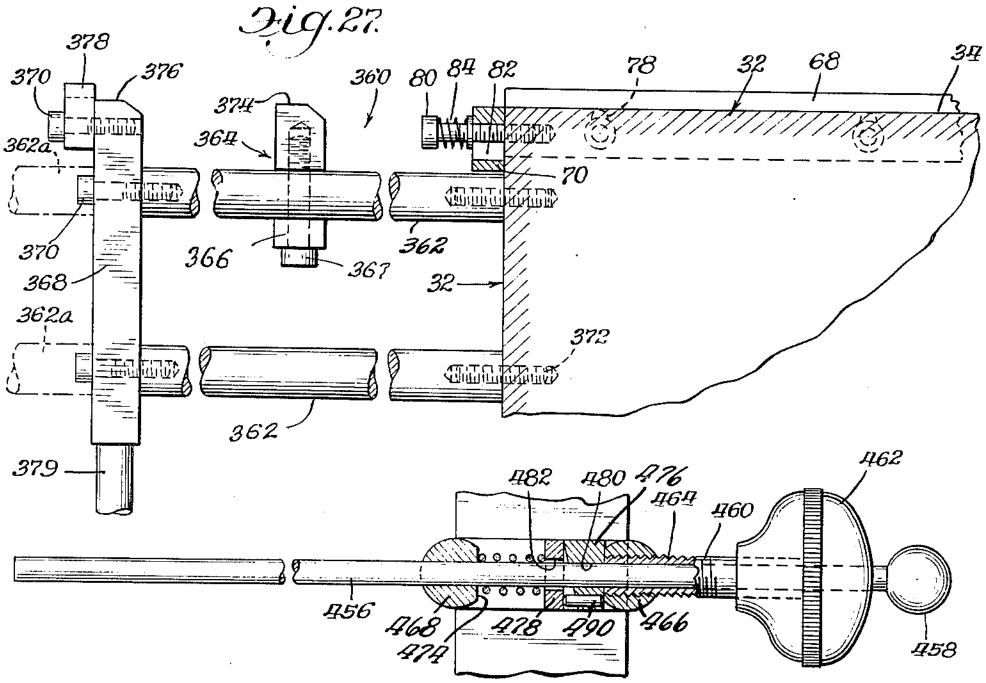
Figure 29:
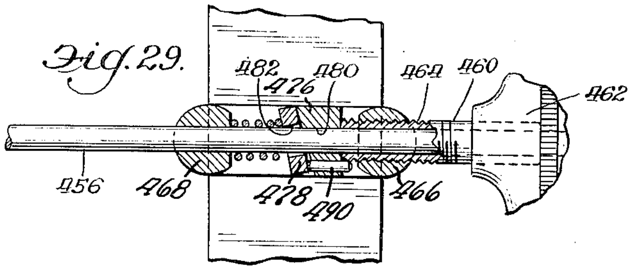

FIG. 20 also is a view of the center punch and spindle, but showing portions thereof in different positions relative to FIG. 19, and also showing certain related parts of the carriage on which the spindle is mounted, the latter being shown in section;

FIG. 21 is a view taken on 21—21 of FIG. 20;

FIG. 22 is front elevational view of the elevating and locking means for the vertically adjustable support, and taken generally in the direction of the observer's view in FIG. 4;

FIG. 23 is a sectional view taken approximately on line 23—23 of FIG. 22;

FIG. 24 is a view of the quick locking device shown in FIG. 15, but in relatively end-for-end position relative to FIG. 15;

FIG. 25 is a side elevational view taken approximately on the line 25—25 of FIG. 22;

FIG. 26 is a plan view of a corner of the bed on which the workpiece is placed, and extension means forming an effectively lengthened bed;

FIG. 27 is a view taken approximately on the line 27—27 of FIG. 26;

FIG. 28 is a sectional view of the quick locking device shown in FIG. 24, but taken on a plane transverse to that of FIG. 24; and FIG. 29 is a view similar to FIG. 28, but showing certain of the elements in different positions.

Figures 1, 2, 3:
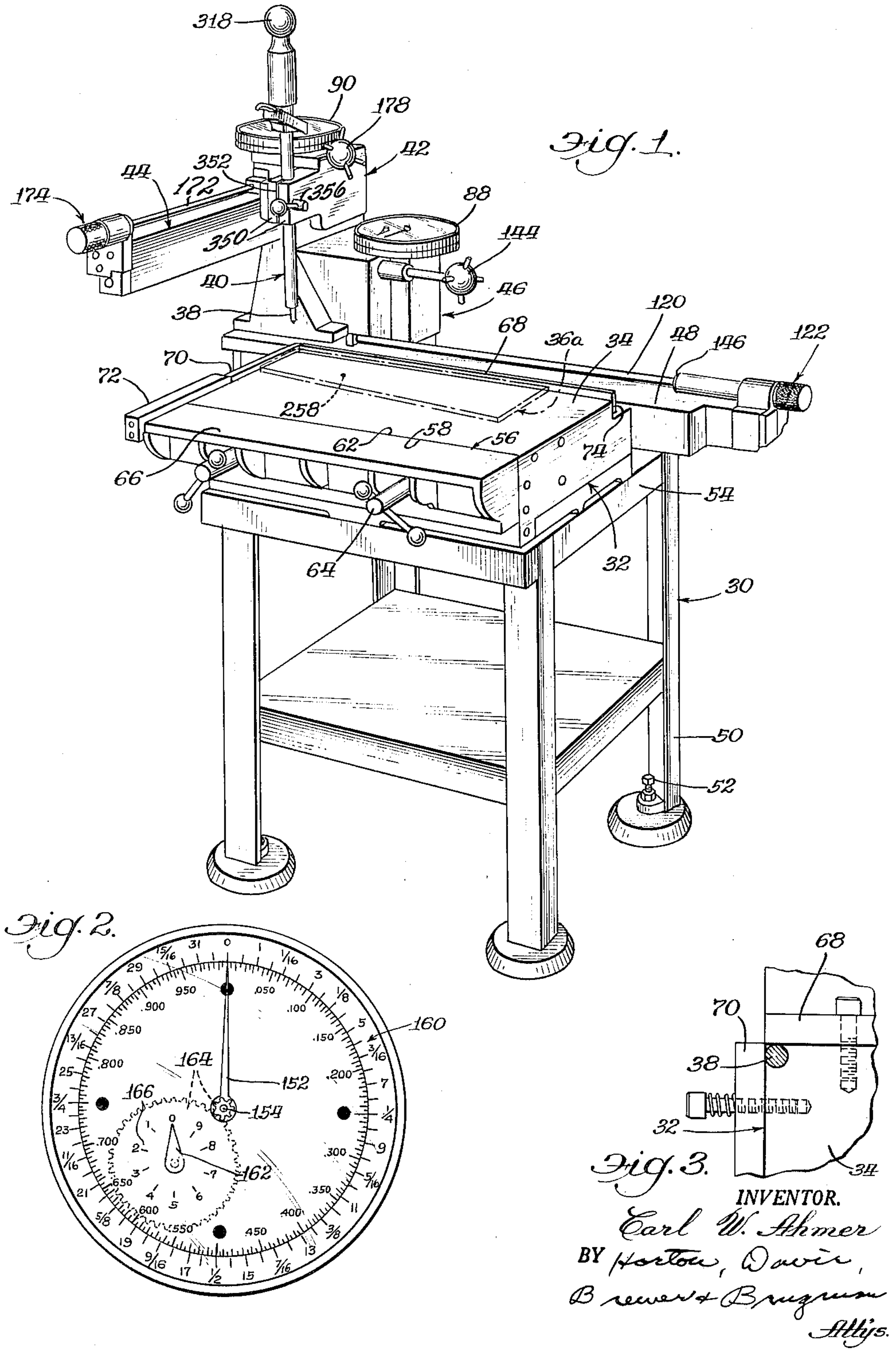
FIG. 1 is a perspective view of the device of the present invention, which may be considered a basic device without special attachments thereon.
FIG. 2 is a plan view of one of the distance indicating dials utilized in the device.
FIG. 3 is a fragmentary plan view of a corner of the supporting bed with the center punch shown in a corner thereof.

Referring now to FIG. 1, this figure shows the device of the present invention in the condition in which it may be regarded as the basic device or machine without any special attachments thereon such as are included in FIG. 4 and which will be referred to in detail hereinbelow. The device in its essential aspects and as represented in FIG. 1 includes a table or stand 30 which may be of any suitable construction such as being formed of steel angle pieces and other pieces appropriately welded together to provide the desired strength. Mounted on the table or stand 30 is a table member 32 having a top surface 34 forming a bed for a workpiece **36*a* on which marking indications are to be made. A center punch 38 is mounted for movement over the bed 34 for universal movement in both horizontal directions for locating it at any desired point over the workpiece 36*a***, or any workpiece placed on the bed, for performing a marking operation thereon.

The punch 38 is mounted in means which will be described in detail hereinbelow, but briefly such mounting means includes a spindle 40 mounted on a carriage 42 which in turn is mounted for longitudinal movement along an arm 44. The arm 44 in turn is supported by another carriage 46 which in turn is mounted for movement longitudinally along an arm 48 supported by the table or stand 30. Thus the movement of the carriages 42 and 46 along mutually transverse lines enables positioning of the punch 38 at any desired location over the bed 34.

Referring now more in detail to the specific elements making up the structure of the device, the stand 30 includes legs 50 provided if desired with securing means 52 for securing the stand solidly to the supporting surface. The stand includes a top element 54 which directly supports the table member 32. The table member 32 is preferably a casting and has such conformations as desired to reduce its total weight while providing the desired strength, in a manner well known in constructing such members. The top or bed 34 on which the workpieces are placed is highly machined for presenting a perfectly flat surface for accurately positioning the workpieces thereon.

An extension 56 of the table member 32 is provided for increasing the dimension of the bed in front-to-rear direction, this extension being detachable for enabling application of certain of the attachments illustrated in FIG. 4. The front surface 58 (see also FIG. 4) of the table member 32 is provided with openings 60 for receiving registering projections (not shown) on the mating surface 62 of the extension 56 and for threadedly receiving threaded securing means 64 (FIG. 1), together effective for securing the extension 56 to the table member 32 against accidental displacement. The surface 62 of the extension has substantial vertical extent, as does the table member 32, for solidly securing the extension to the table member, and the extension is so dimensioned and proportioned that the top surface 66 thereof forms an extension of the bed 34 in accurate flush relation thereto. Upon the removal of the extensions 56, workpieces may be fitted to the surface 58 (FIG. 4) in a manner described in detail hereinbelow.

The bed 34 and the top surface 66 of the extension 56 may of course be of any desired dimensions and proportions, but for reasons set out fully hereinbelow it is desired that the bed be of such dimensions as to facilitate recognition of multiples thereof, such, for example, as 10″, 20″, etc. In a practical embodiment of the invention, it has been found that the bed 34 may be, for example, 20″ in length (sideways FIG. 1) and 10″ in width (from front to rear FIG. 10) while the surface 66 of the extension 56 may be of any desired dimension from front to rear. The latter dimension may for example be 4″.

Secured to each of two mutually perpendicular sides of the table member 32 are coordinate guides 68, 70, and 72. The coordinate guide 68 which may be identified as a long coordinate guide, is secured to the rear surface 74 of the table member by suitable means such as cap screws 76 (FIG. 8) extended through openings 78 in the coordinate guide and threaded into tapped holes in the table member. These openings 78 are elongated in vertical direction to enable the coordinate guide to be lowered without removing the screws, if for example it should be desired for the workpiece to be projected thereover in rearward direction. Normally this coordinate guide is positioned in its fully elevated position shown in FIG. 8 where it provides a stop for abutment by the workpiece to be worked on.

The coordinate guides 70 and 72 together form abutment means along the left end of the table member, being identified as the inner short coordinate guide 70 and the outer short coordinate guide 72. The guide 70 is mounted for movement similarly to the coordinate guide 68 by suitable means shown in FIG. 27, i.e., by cap screws 80 extending through vertical slots 82 in the guide and threaded into tapped holes in the table member 32. In the present instance compression springs 84 are preferably interposed between the caps of the screws and the coordinate guide, to facilitate the vertical adjusting movements of the guide in view of the fact that the present guide 70 normally is adjusted more often than the long coordinate guide 68. Preferably the outer short coordinate guide 72 is relatively fixedly mounted, i.e., not adjustable, because the guide is utilized for mounting certain portions of the attachments shown in FIG. 4, as described hereinbelow. The coordinate guide 72 may be secured in place by cap screws 86 (FIG. 26). The inner short coordinate guide 70, when lowered to its lowermost position, is flush with or below the top surface or bed 34 to enable the workpiece to be projected over the end of the bed in that direction, as may be a common occurrence as explained more fully hereinbelow.

The carriages 42 and 46 are basically similar to each other, but have detail differences to be described below. In view of the similarity of these two carriages, and the mechanisms embodied therein, a description of one will suffice for the most part for the other. As pointed out above the carriages are mounted for mutually transverse movements along horizontal lines, or along coordinate lines. The punch spindle 40, mounted on the carriage 42, is moved directly by that carriage in directions along one coordinate line, and specifically from front to rear. The carriage 42 and thus the spindle 40 are carried by the other carriage 46 along the other coordinate line and thus moved transversely of the table. These two movements are indicated by dials 90 and 88 which are identical in construction and function.

Figure 8:
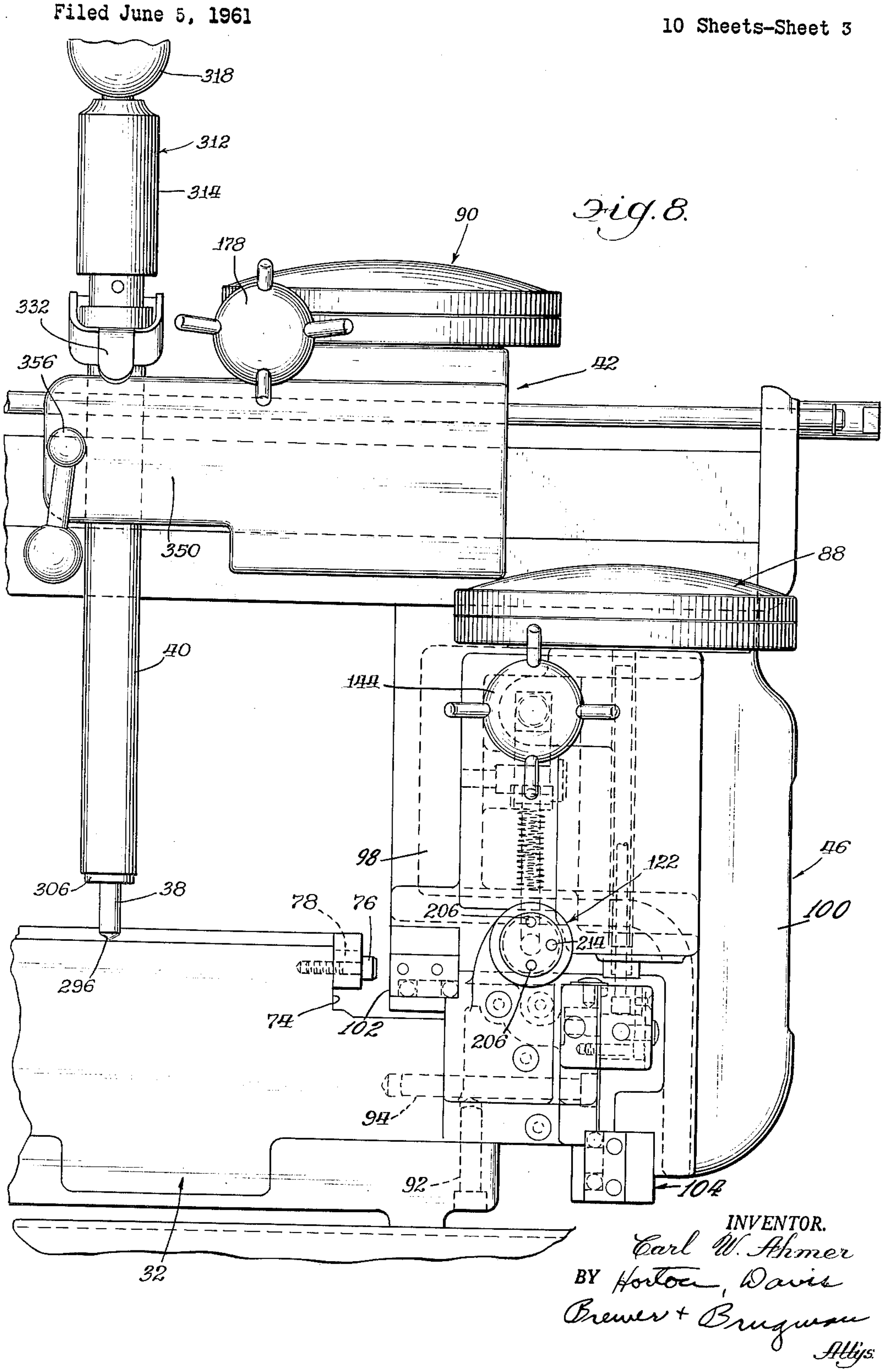
FIG. 8 is a view from one end of the device showing the two carriages and a fragment of the table or stand.
Figures 11, 12, 13:
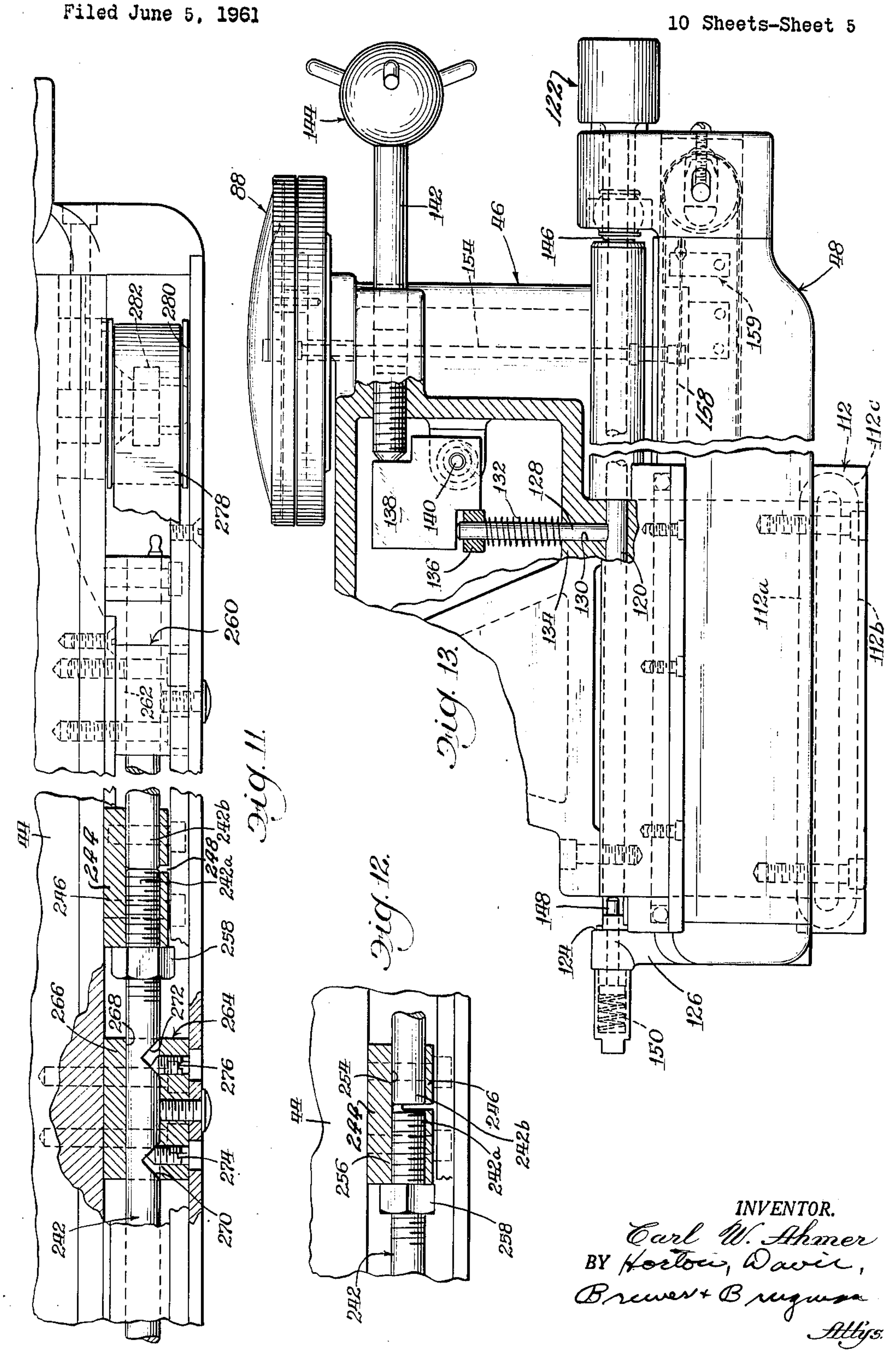
FIG. 11 is an enlarged detailed view of certain of the elements shown in FIGS. 9 and 10, and oriented according to FIG. 9, the present view being partially in section.
FIG. 12 is a fragmentary view of a portion of the elements shown in FIG. 11, but with at least one of the elements in a different position relative to FIG. 11.
FIG. 13 is a side view of one of the carriages, with portions shown in section.
Figure 17:
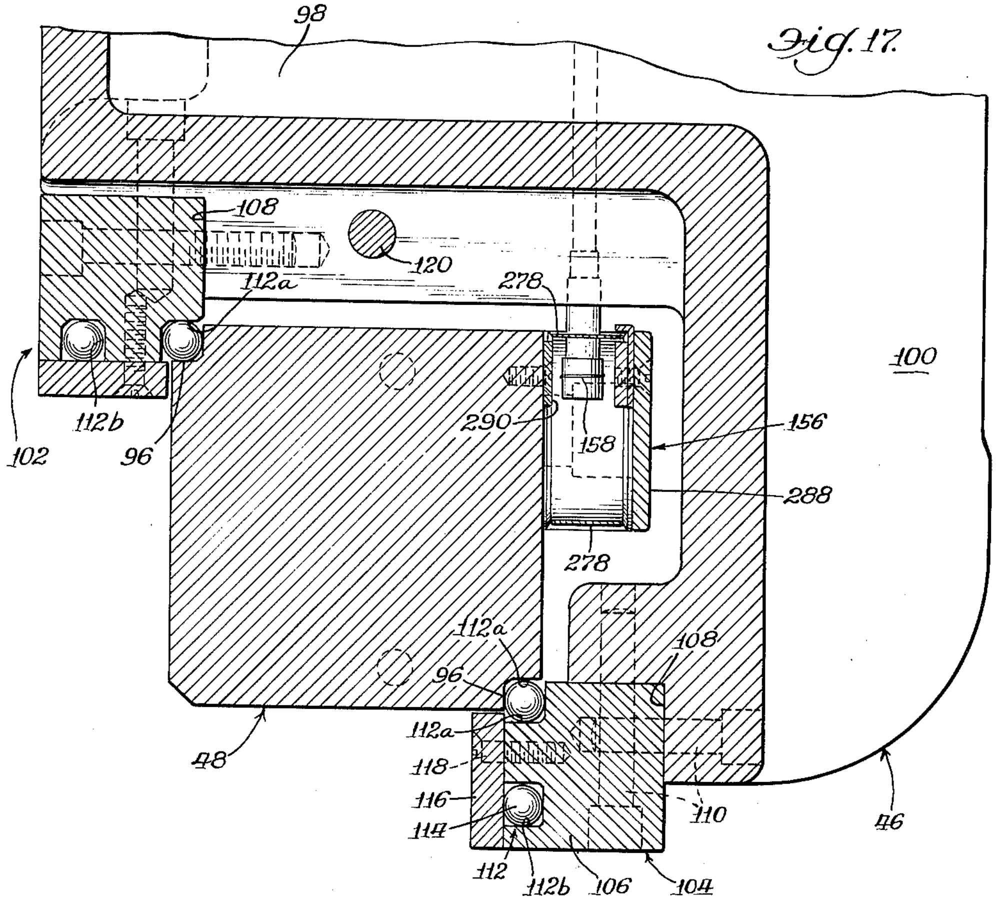
FIG. 17 is a sectional view of one of the arms mounting the carriages and showing particularly the novel bearing means for supporting the carriage on the arm.

Referring first to the carriage 46, attention is directed to FIGS. 1, 8, 13 and 17. FIG. 8 is an elevational view taken from the right, at the right rear corner of the device of FIG. 1, and FIG. 17 is a view oriented in the same direction as FIG. 8, but is a sectional view through a certain portion of the carriage 46 and the supporting arm 48 therefor. FIG. 13 is a view in a direction transverse to FIGS. 8 and 17, but including the same carriage 46. The arm 48 may be a solid arm and is secured to the stand 30 by any suitable means such, for example, as the cap screws 92 and 94 (FIG. 8) securing the arm solidly against two surfaces. The arm 48 is provided with corner grooves 96 (FIGS. 8 and 17) in diagonally opposite corners and specifically in the upper inner corner and outer lower corner. The carriage 46 may be a casting of suitable shape to include the various instrumentalities incorporated therein and specifically including a portion 98 overlying the arm 48 and a downwardly extending portion or leg 100 disposed outwardly of the arm 48 and terminating adjacent to the lower surface of the arm. These portions 98 and 100 serve as the immediate elements for mounting the carriage on the arm 48 through the instrumentality of bearings 102 and 104 which essentially are identical. Each bearing includes a block 106 fitted in a corner groove 108 in the corresponding portion of the carriage and fitted against the transverse surfaces thereof solidly to mount the bearing in solid relation to the carriage for proper functioning relative to the arm 48. The bearings may be secured to the carriage by cap screws 110 extending in each of opposite transverse directions for solidly securing the bearing block in position. Each bearing 102 and 104 includes a race 112 of a shape shown in the lower portion of FIG. 13 which is continuous with straight side portions **112*a* and 112*b* and semi-circular end portions 112*c***.

Loose bearing balls 114 filled or substantially fill race and are confined in the race by a cap plate 116 in those portions where the race would otherwise be exposed, but the straight portion **112*a* is presented to the corresponding groove 96 in the arm 48 for engagement by the bearing balls with the surfaces of that groove, for resulting bearing support, the surfaces of the groove 96 retaining the bearing balls in the race at those locations. The plate 116 may be secured in position by suitable means such as screws 118. The bearings 102 and 104 are so dimensioned and so positioned in the carriage 46, relative to the arm 48 that the bearing balls 114 thereof which are disposed on the side for engaging in the groove 96 of the arm are under compression, or preloaded against both surfaces of each of the groove 96 and the portion 112*a* of the race. It will be noted that the portion 112*a* of the race is composed of only two surfaces, a horizontal and a vertical bearing surface. The portion 112*b* and the curved end portions 112*c* may have three sides and the balls in these portions are relatively free floating. The tendency of the carriage 46, due particularly to the arm 44 and top carriage 42, is to rotate about the longitudinal axis of the arm 48 in a counter-clockwise direction (FIG. 17). The preloaded bearing balls 114 engaging in the grooves 96 and race portions 112*a* resist this tendency and due to the solid mounting of the arm 48, the carriage is prevented from rotating about the axis. Since the grooves 96 are made up of only horizontal and vertical surfaces, and there are no inclined surfaces engaged by the bearing balls, it is possible to maintain the carriage 46 in prefetly aligned position. The tendency of the carriage to rotate, due to the weight of arm 44 and upper carriage produces forces that are essentially downward on the upper bearing 102 against the horizontal surface of the corresponding groove 96, and upwardly on the bearing 104 producing forces on the horizontal surface of the corresponding groove 96, while the preloaded bearing action against the vertical surfaces prevents lateral play in the carriage. The surfaces of the grooves 96 as well as the surfaces 108 in the carriage 46 against which the bearings about, all being relatively perpendicular to each other, and being horizontal or vertical, there is no danger of permenant inaccuracy occurring in placing the bearing 102 and 104 in place, because if in a first attempt to fit the bearings in place it should be found that they fit too tight or too loose, the corresponding surfaces can be ground or reground to reposition the respective bearings in proper and accurate position, in such a manner as would be impossible in the case of inclined bearing surfaces on either the arm 48 or the carriage or bearings. It will be understood that the bearing balls 104 are free in the sense that they are detached from one another and are permitted to move in the non-circular race 112**.

Locking of the carriage 46 in adjusted position and making micrometric adjustments in the carriage are accomplished by means which includes an adjusting shaft 120 extending longitudinally of the arm 48 and located above that arm. One end of the arm is incorporated in an adjusting nut assembly 122, described in detain hereinbelow, and the other end of the shaft is supported in a bearing portion 124 (FIG. 13) formed in an extension 126 of a fixed portion of the device such as being mounted on the arm 48. The adjusting shaft 120 is movable longitudinally by manipulation of the adjusting assembly 122, and the bearing support 124 accommodates sliding of the adjusting shaft relative thereto.

The carriage 46 may be locked to the adjusting shaft 120, in adjusted position. This is accomplished through the medium of a clamp pin 128 (FIG. 13) slidably mounted in an aperture 130 in the carriage 46 and arranged for its lower end to engage the adjusting shaft 120. The lower end of the pin is preferably rounded to a shape concentric with the rounded surface of the shaft for secure clamping engagement with the shaft. A compression spring 132 may be interposed between the carriage element 134 and the head 136 of the pin for biasing the pin upwardly and out of locking position. The pin is moved downwardly into locking engagement with the shaft 120 through the medium of a pivot clamp block 138, pivoted at 140 and engaging the upper end of the pin 128 at one side and engaged at the other side by the inner end of a clamp screw 142 threaded in the adjacent element of the carriage 46 and having a hand knob 144 at the outer end thereof. Upon tightening the screw 142 and consequently moving the screw inwardly the clamp pin 128 is moved downwardly into engagement with the adjusting shaft 120, and of course turning the screw outwardly releases the clamping action. The knob 144 may be utilized conventiently for grasping by the hand for manipulating the carriage 46 and moving it along the arm 48. This knob, since it is to be manipulated for locking the carriage 46, is positioned for convenience to the operator who normally would be in the front of the machine. This arrangement of the screw 142 places it substantially parallel with the adjusting shaft 120 and hence the use of the clamp block 138 for changing the direction of the clamping force exerted by the screw 142.

Preferably a bumper 146 (FIG. 1) of resilient material is interposed in the nut assembly 122, for engagement by the carriage 46 to prevent undue shock. At the opposite end of the adjusting shaft 120, bumper means is provided for engagement by the carriage 46 and includes a pin 148 (FIG. 13) slidably mounted in a bearing means in the extension 126 and engaged by a compression spring 150. If the carriage should be moved with accidental unusual force against the pin 148, the spring 150 will yield and prevent damage. However, the spring 150 is relatively strong and in the usual or normal course of events will not yield, or it will yield only very slightly, and is sufficiently strong to retain the pin 148 in extended position for positioning the carriage and retaining it in its normal home or its zero position.

The dial 88 mounted on the carriage 46, as noted above, is identical with the dial 90 and will be described in further detail in connection with the carriage 42, but briefly it might be stated that the dial 88, as viewed in FIG. 2, includes an indicator hand 152 mounted on a spindle 154 and extending downwardly through the carriage 46 into an enclosed housing 156 (FIG. 17) where a wire 158 is coiled therearound, the ends of the wire being fixed in mounting means 159 (FIG. 13), one at each end of the housing which extends throughout, and beyond, the range of movement of the carriage. Upon movement of the carriage, the wire causes rotation of the spindle and hence sweeping of the hand 152 over the dial. Around the periphery of the dial are suitable scales 160 to indicate the degree of movement of the carriage. The hand 152, being secured to the spindle, makes one complete revolution for each revolution of the spindle and the scales 160 are accordingly calibrated to indicate the extent of movement of the carriage. The dial is provided with another hand 162 geared to the spindle 154 through suitable gears 164 which have suitable ratio which in the present instance is 1 to 10. Associated with the hand 162 is a scale 166 having ten places or space markings such that movement of the hand between each two adjacent space markings indicates one complete revolution of the hand 152. Other than the foregoing description of the dial, the dial may be of any desired construction.

Referring now to the carriage 42 and the associated portions of the device, attention is directed to FIGURES 8 to 14, inclusive, and 20. The arm 44 (FIG. 20) which may be generally solid, has one end rigidly secured to the carriage 46 and extends over the bed 34. The arm 44 is provided with corner grooves 168 in diagonally opposite corners for receiving bearings 170 similar to, arranged in the same manner as, and functioning in the same manner as those described in connection with FIG. 17.

Associated with the arm 44 is an adjusting shaft 172 extending longitudinally of the arm and positioned thereover. This shaft extends through the carriage 42 and is utilized for locking the carriage 42 in adjusted position along the arm 44, and for making micrometric adjustments of the carriage through manipulation of the adjusting screw 174 (FIG. 14) included in an assembly identical with the assembly 122 referred to above. Incorporated in the carriage 42 is a clamp screw 176 threaded opening in the carriage and having its inner end engageable with a pin 177 which in turn engages the adjusting shaft 172. The inner surface of the pin 177 is rounded for engagement with the shaft in concentric relation thereto. On the outer end of the clamp screw 176 is a hand knob 178 for use in turning the clamp screw, and for grasping by the operator for moving the carriage 42 to the desired position along the arm 44.

Figure 14:
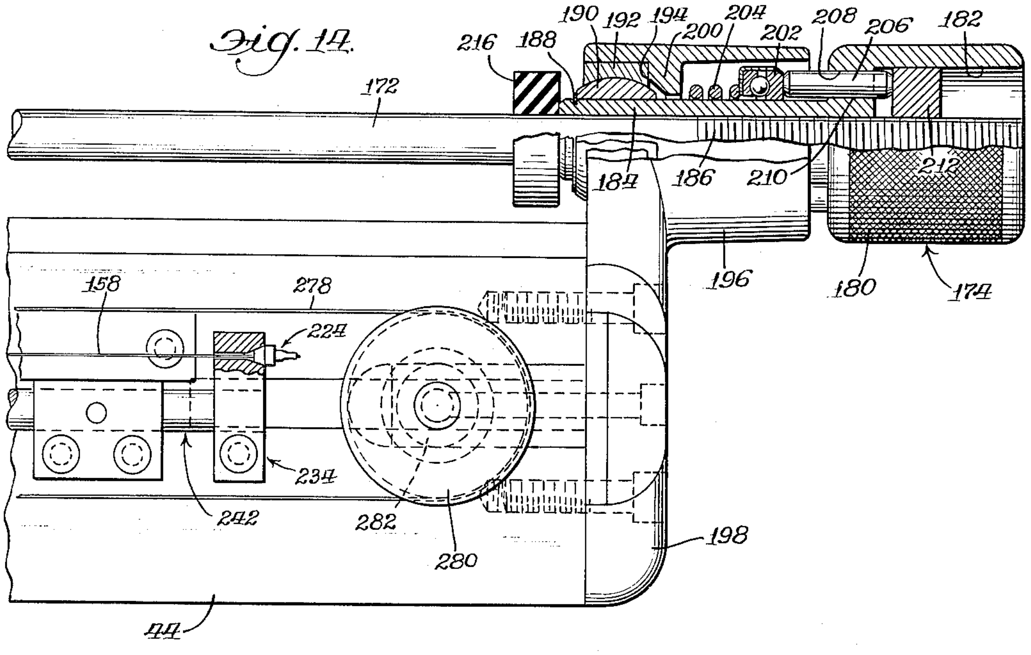
FIG. 14 is a fragmentary view of the outer end of one of the arms supporting the carriages, and showing a portion in section illustrating the novel means for preventing backlash.

The screw assembly for making fine adjustments, as best shown in FIG. 14, includes an adjusting knob 180, having an outer cavity 182, and a reduced sleeve 184 internally threaded, for threading engagement with the threaded portion 186 of the adjusting shaft 172. The sleeve 184 at its inner end is provided with an external clip or ring 188 preventing movement of the knob in backing-off direction (to the right—FIG. 14) through engagement of that clip with a curved retainer ring 190 which is positioned within complementary outer ring portions 192 fitted in a recess 194 in a tubular portion 196 formed on an end piece 198 fixedly secured to the end of the arm 44 and thus forming a fixed piece of the apparatus with respect to movement longitudinally of the adjusting shaft 172. The tubular portion 196 includes an internal radial rib 200 which partially forms the recess 194 and compressed between this rib and a conventional bearing 202 is a coil spring 204 biasing the bearing outwardly (to the right—FIG. 14) against a plurality of pins 206 which are preferably two in number (see FIG. 8) freely slidable in apertures 208 in a web 210 formed between the sleeve 184 and the outer enlarged portion of the nut 180. These pins engage a screw back-lash nut 212 threaded on the threaded portion 186 of the adjusting shaft and positioned within the cavity 182 of the knob 180. A screw 214 (FIG. 8) is inserted through a hole or slot in the nut 212 and threaded into a tapped hole in the web 210 (FIG. 14) for locking the nut 212 with the knob 108 for conjoint rotation thereof. This construction eliminates all backlash in adjusting movements of the shaft 172, for which the arrangement is provided, through the constant compressive action of the spring 204. For example as the nut 180 is turned in (to the left—FIG. 14) the relative stationary position of the knob longitudinally of the shaft, through the action of the spring 204 results in the adjusting shaft being moved outwardly (to the right—FIG. 14). Upon turning of the nut 180 in the opposite direction, or in backing-off direction, the spring 204, acting through the bearing 202 and pins 206 on the nut 212, retains the knob in snug engagement with the threaded portion 186 of the shaft in the same effective direction. A bumper 216 (FIG. 14) is provided on the adjusting shaft 172 for engagement by the carriage 42 to prevent shock thereto. At the other end of the adjusting shaft 172, the shaft is mounted in a fixed element 218 for sliding movement therein. Also adjacent to this end of the shaft is a pin 220 (FIG. 9) for engagement by the carriage, which is spring loaded as described above in connection with the pin 148 (FIG. 13) to prevent shock to the carriage when moved in that direction.

Figure 5:
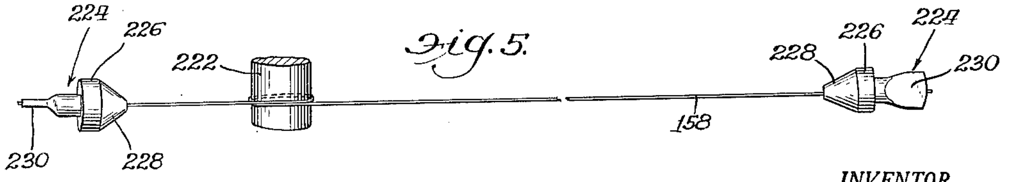
FIG. 5 is a perspective view of a portion of the means for indicating movement of the marking element.
Figures 9, 10:
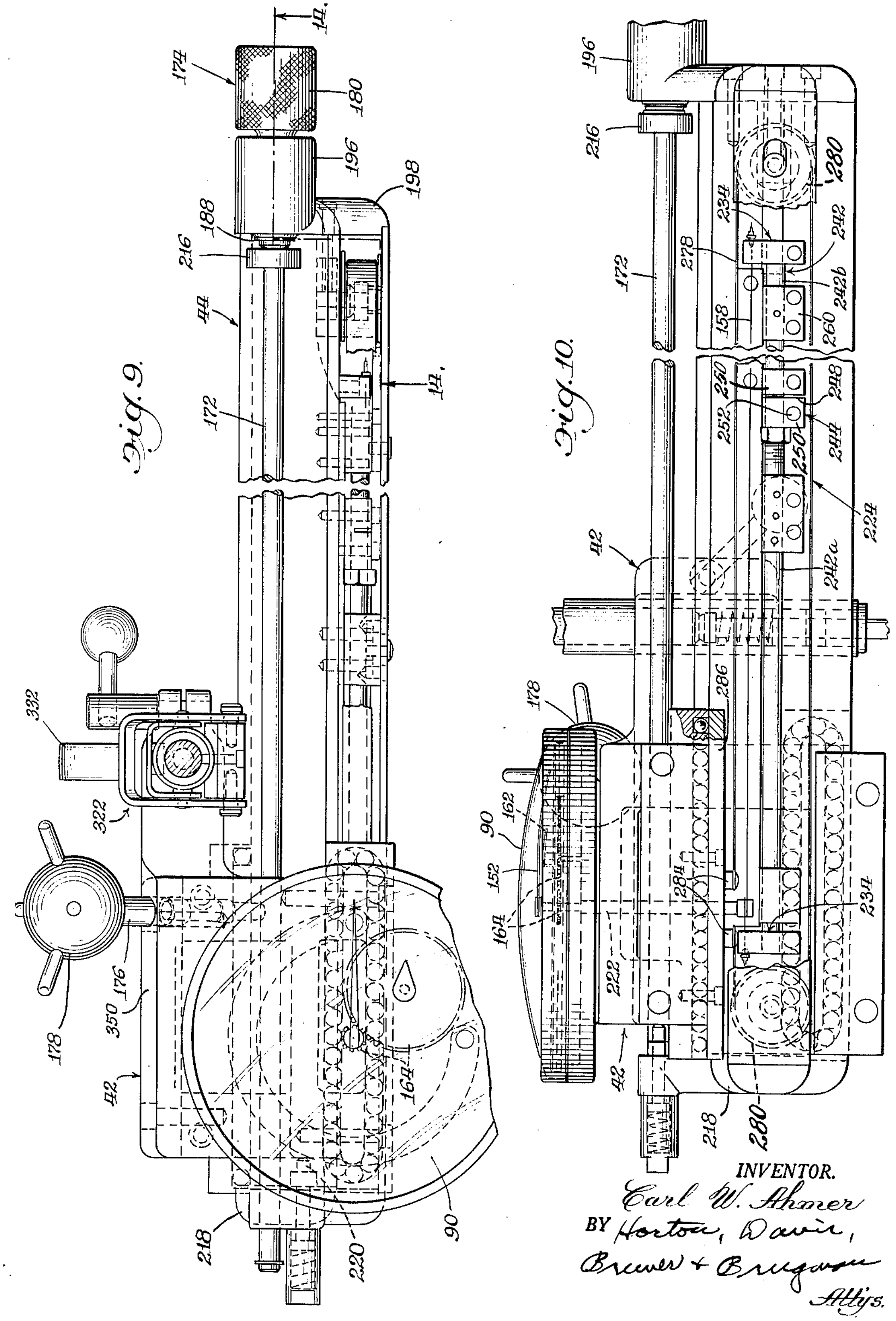
FIG. 9 is a plan view of one of the carriages and the arm supporting it, with a portion broken away.
FIG. 10 is a side view of the portion of the device shown in FIG. 9.

As described above in connection with the dial 88 on the carriage 46, the dial 90 on the carriage 42 is provided with a spindle 222 which extends downwardly through the carriage 42 into a housing 224 which is similar in all material respects to the housing 156 (FIG. 17) referred to above, and the following description may be considered as covering both of these housings. In each case the housing extends along the respective arm throughout, and beyond, the range of movement of the corresponding carriage. The wire 158 referred to above is also shown in FIG. 10 in connection with the dial 90. This wire, as shown best in FIGS. 5 and 7, is provided at its ends with fittings 224 each of which includes an inner portion 226 having a conical bearing surface 228 and an outer flattened portion 230. Each fitting is provided with a central aperture or bore 232 therethrough receiving the end of the wire. The outer reduced portion 230 after insertion of the end of the wire in the bore is pinched to securely grip the end of the wire therein. The fitting is mounted in an end block 234 having an aperture 236 receiving the wire, the aperture terminating in a tapered counter-bore 238 receiving the conical bearing surface 228 of the fitting. One such block 234 is positioned adjacent each end of the housing (FIG. 10) each receiving a fitting 224 for mounting the wire thereon and therebetween. These two block are noramlly positioned for retaining the wire taut in a manner described below, and the operator of the machine may twist one fitting or the other to remove undesired twisted condition in the wire, also as described hereinbelow. The wire 158 as referred to above is coiled about the spindle or shaft 222 preferably by only one turn, but it may be coiled two or more turns to increase frictional turning forces, if such should be desired.

It is desired that the shaft 222 have cylindrical exterior surface, but it is within the compass of the present invention to provide a threaded shaft such as 240 (FIG. 6) in an arrangement in which the wire is fitted in the threads thereof. This phase of the invention will be referred to again hereinbelow. The wire 158 is mounted by means of a wire support shaft or rod 242 (FIGS. 9 to 12) which is made up of two segments, 242_a_ and 242_b_. The two segments are normally secured together to form a rigid, effectively unitary rod, by means of a clamp block 244 which has a solid portion 246 (FIGS. 11 and 12), but is transversely slotted at 248 (FIGS. 10 and 12) to provide realtively resilient ears 250. These ears receive securing means such as screws 252 for drawing the ears together in clamping the block on the ends of the segments of the rod which are inserted into a central aperture 254 of the block to a position approaching each other. One of the rod segments, such for example as 242_a_, is threaded as shown at 256 for receiving an adjusting nut 258. However, the threaded portion of the rod is freely slidable in the bore 254 when the ears are released from locking pressure, and upon adjusting movements of the nut 258, the rod segments may be relatively moved and thus the rod effectively lengthened (or shortened), the nut reacting against the block 244 in the lengthening movement. The blocks 234 (FIGS. 7 and 10) are rigidly secured to the ends of the rod 242 by suitable means, and upon adjusting of the rod segments toward or from each other, the wire 158 is loosened or tightened respectively.

Adjacent to the ends of the rod are guide blocks 260, secured to the arm 44 and having central bores 262 slidingly receiving the end portions of the rod. These blocks 260 merely support and guide the ends of the rod.

Means is also provided for shifting the rod 242 bodily in one direction or the other, longitudinally of the rod, and this means is shown in its entirety at 264 (best shown in FIG. 11). This means includes a block 266 fitted to and secured to the arm 44 and having a central longitudinal bore 268 receiving the rod. The rod is provided with V-knotches 270 and 272 receiving set screws 274, 276, respectively threaded in tapped holes in the block 266. These screws are so spaced apart, relative to the spacing apart of the V-knotches, that they engage relatively opposite inclined surfaces of the knotches, whereby upon loosening of one screw and tightening of the other, the rod may be shifted bodily in one direction or the other. Upon shifting the rod to the desired adjusted position, both screws are then tightened to lock the rod in such adjusted position. The shifting of the rod 242 in this manner is utilized for making adjustments in the dial 90 (88) as will be referred to again hereinbelow.

It is desired that the housing 224 be enclosed to prevent the entrance of foreign matter thereinto. For this purpose means is provided to so enclose that space and at the same time accommodate longitudinal movement of the spindle 222 of the dial, which extends into the housing. To accomplish this, a band 278 is provided (see FIGS. 10, 11 and 17). This band is in the form of a strip of flexible steel and is trained on rollers 280 journaled on suitable means 282 mounted on the arm 44. The band forms a belt, in itself discontinuous, but secured at its ends to elements 284 (FIG. 10) on a fitting 286 secured to the carriage assembly, thus linking the ends of the band to form a continuous belt. Thus upon movement of the carriage 42 and the spindle 222 therein along the arm, the belt or band 278 is moved along therewith and the interior of the housing remains closed and confined thereby. An outside vertical cover plate 288 (FIG. 17) may be utilized for closing the lateral outer side of the housing. The housing may include suitable strips or plates such as 290, which are utilized as guides and supports and also as baffles to exclude foreign matter at the edges of the band.

Attention is directed next to the center punch 38, referred to above, as to its construction and function, and its mounting in the carriage 42. The center punch is incorporated in what may be referred to for convenience as a punch assembly 292 and attention is directed particularly to FIGURES 19 and 20 for the details of construction thereof. The center punch 38, per se, includes a shank portion 294 having a punch point 296 at its lower end, and a head 298 at its upper end. The punch is mounted for vertical reciprocation in the spindle 40 which is generally tubular in form having a bore 300 therein dimensioned for free sliding movement of the head 298. adjacent to the lower end of the spindle is an upwardly facing internal shoulder 302 which may be formed by a guide bushing 304 fitted in the lower end of the spindle. If desired, a flange 306 may be provided on the bushing for engagement of the lower end of the spindle. A compression spring 308 is interposed between the shoulder 302 and the head 298 to bias the center punch 38 upwardly.

The spindle 40 may be of uniform construction and slidably mounted therein is a shaft 310 forming a part of a striker 312 which includes a body 314 secured to the upper end of the shaft by suitable means such as a set screw 316. A hand-grip knob 318 is mounted on the top of the body 314 and secured thereto by any suitable means. The lower end of the body 314 preferably is reduced as at 320 to a dimension similar to that of the spindle 40.

Mounted on the spindle 40 is a retractor means designated as a whole at 322, this means being also shown in FIG. 21. This retractor means includes a retractor lever 324 of generally U-shaped construction (FIG. 21) having side arms 326 straddling the spindle 40 and pivotally mounted at their extended ends by means of a pin 330 in a retractor mounting block 328 secured to the spindle 40 by suitable means. On the outer swinging end of the retractor lever 324 is a finger-grip extension 332.

Carried by and cooperating with the retractor lever 324 is a retractor arm 334 which is also of U-shape construction (FIG. 21) having side arms 336. This retractor arm is disposed within the confines of the retractor lever, with its side arms 336 adjacent to or engaging the inner surfaces of the side arms 326 of the lever and pivotally mounted therein by pivoting means 338 which may, for example, be rivets. The axis of this pivoting means 338 is in the region of the transverse plane containing the vertical axis of the punch and spindle, although this relationship varies slightly in the function of the retractor means as described hereinbelow. Secured to the crosspiece 340 which interconnects the side arms 336 of the retractor arm is a clip 342 of generally inverted L-shape, having a long leg 344 engaging and secured to the inner surface of the transverse piece 340, and an upper relatively short leg 346 which is adapted to engage under the reduced portion 320 of the body 314. The lower edges of the transverse element 340 and the clip 342, together are shaped as indicated at 348 (FIGS. 19 and 20) to provide a sharp edge for engaging over the upper end of the spindle 40.

The punch assembly 292 is mounted in the carriage 42 by means of a pair of clamping jaws 350 provided by extensions of the body of the carriage. These jaws are divided by a slit 352 (FIGS. 1 and 4) and inwardly of this slit define an aperture 354 dimensioned and shaped to receive the spindle 40. A screw clamp means 356 is provided for drawing up the jaws and gripping the punch assembly in adjusted position, the punch assembly being vertically adjustable, the jaws being released upon release of the screw means 356.

The retractor means 322 assumes an inactive position shown in FIG. 20 wherein the overhanging leg 346 of the clip 342 extends between the upper end of the spindle 40 and the lower edge of the reduced portion 320 of the striker body 314. This element is the only element interposed between those members and thus the reduced portion 320 is spaced upwardly from the spindle 40 a distance only the thickness of this element. The striker thus is in its lowermost position and it engages the center punch 38 and holds the latter in a position which is projected relative to its innermost position to which it is moved by the compression spring 308.

The retractor means 322 serves as a means for quickly raising the striker and retaining it in such raised position on releasing the retractor means. With the retractor means in the inactive position shown in FIG. 20 the operator grips the finger-grip 332 and raises it, swinging the retractor lever 324 about the axis of the pin 330. The arc of movement of the rivets 338 which mount the retractor arm 334 on the retractor lever is such that the element 346 of the clip 342 remains in engagement with the under-surface of the reduced portion 320, and is not permitted to disengage therefrom, as by slipping outwardly (to the right—FIGS. 19 and 20). When the retractor lever has been raised sufficiently, to a position at or slightly above that shown in FIG. 19, and with the element 346 remaining under the reduced portion 320, the lower edge 348 of the retractor arm moves inwardly, until limited by the shaft 310, and engages the upper edge surface of the spindle 40. This movement is brought about by the weight of the striker bearing downwardly on the element 346, which swings the retractor arm about its pivotal mounting, namely the rivets 338, to the position mentioned, namely, that of FIG. 19. The operator then releases his grip on the retractor lever 324 and it remains in the raised position, with the striker in raised position, or that of FIG. 19.

When the operator wishes to perform a punching or marking operation, he grasps the hand-grip knob 318 and raises the striker a considerable distance, and then by hand force, drives it downward so that the striker rod 310, guided by the spindle bore 300, delivers a directed and forceful blow upon the center punch head 298. When the striker is so raised preparatory to driving it downwardly, the effect of its weight on the retractor arm 334 is eliminated, and the retractor means moves under its own action to the lower position of FIG. 20 due to the weight of the retractor lever 324 acting on the retractor arm which causes a toggle action through the mounting means 338, which tends to lengthen the distance between the pin 330 on which the retractor lever is mounted, and the edge 348 of the retractor arm. One component of the movement of the retractor arm 324 is relative counter-clockwise movement thereof about the axis of the rivets 338, with the result that the lower edge 348 of the retractor arm moves beyond the outer periphery of the spindle and drops to the position shown in FIG. 20. However, the dimensions of the parts are such that the inwardly extending element 346 of the clip 342 remains within the confines of the outer periphery of the spindle, and of the reduced portion 320, so that it always remains in engagement with the reduced portion 320, so as to be enabled to again raise the striker when the retractor lever is raised.

It will be understood, of course, that upon driving the striker downwardly, the lower end of the shaft engages the head 298 and drives the center punch downwardly to perform the punching or marking operation on the workpiece disposed under the punch.

In practical use of the device, the punch assembly is positioned over the workpiece, slightly raised from its lowermost position. Assume a workpiece having a vertical dimension or thickness similar to that indicated at **36*b* in FIG. 20; the full line position of the center punch is that assumed when the striker is in its lowermost position which is that shown in that figure, with the whole punch assembly mounted in the vertical position indicated. To put the punch assembly into the desired vertical position, the clamping screw means 356 is loosened and the punch assembly is lowered until the center punch point engages the workpiece and is raised for example about ¼″ relative to the remainder of the punch assembly, i.e., relatively so, since the center punch remains positioned while the remainder of the punch assembly is lowered beyond that lowermost position. This relatively raised condition of the center punch raises the striker 312 the same amount from its lowermost position relative to the spindle 40 but this amount is less than the vertical dimension of the retractor arm 334, the latter being for example in the neighborhood of ⅝″. Hence when the striker is raised to its upper position by the retractor arm, to that shown in FIG. 19, the center punch is enabled to be raised off of the workpiece by the compression spring 308. This raised position of the center punch provides clearance between punch tip and the work surface during subsequent movement of the carriages for repositioning of the center punch location. The spindle 40 accurately positions the center punch and guides it, and guides the striker, which acts as a hammer, as it is hand driven downward upon the punch head 298**.

In the use of the device, and in order to produce punchings or markings on a workpiece, the workpiece is placed on the bed 34 in position in which it engages the zero coordinate guides, 68 on the rear side, and 70 or 72 or both on the left end. Then guided by the directions for placing the marking, which are calculated and determined from the zero coordinates, the operator moves the carriage 46, to the appropriate position for placing the punch in the desired approximate position. For example, the operator may move the carriage 46 first. Assuming that a point 258 (FIG. 1) is to be marked on the workpiece **36*a* and this point is for example 5″ from the left end and 4″ from the rear edge. The operator may for example grip the knob 144 on the carriage 46, and loosen it if it should not be loosened at that time, and he moves it along the arm 48 (to the right—FIG. 1) until he finds from observing the dial 88 that the center punch is located approximately 5″ from the guide 70. He then tightens the lock means through the knob 144. He then grips the knob 178 on the carriage 42 and performs an operation similar to that just described to position the center punch approximately 4″ from the rear guide 68. At this time the center punch is in the region of the intended mark 258**.

The foregoing operations result in a rough or coarse positioning of the center punch but, however, this is very rapidly performed. If the punch is not accurately positioned, as is usually the case when rough adjustments are made, the operator effects fine adjustments through manipulation of the assemblies 122 and 174. He then performs the marking operation by lifting the striker and driving it downwardly. This operation is repeated until all of the intended markings are made on the workpiece.

An important feature of the invention is the operation of these indicating dials. The positions of the carriages 46 and 42 are always and accurately indicated by these dials, relative to the starting point which is at the zero corner or juncture between the coordinate guides 68 and 70. The wire 158 (see particularly FIG. 10) is fixed in position for any given adjustment of that wire. The wire is coiled around the spindle 222 of the indicator means and due to the friction set up between the wire and the spindle, there is no slippage therebetween and the degree of movement of the carriage is always accurately indicated, and this is true whether the carriage is moved by manually moving it when unlocked from the rod or shaft 172, or moved by moving that shaft when the carriage is locked thereto. The determining factors for operating the indicator are the mounting of the wire 158 and the position of the carriage, and since these are separate from the bed 34, as such, and from the workpiece, accurate positioning can be achieved, and indicated. The inter-engaging relation between the spindle 222 and the wire 158 remains whether the carriage is unlocked from the rod 172, or locked thereto, and the indications by the dial show the degree of movement of the carriage whether moved in a rough adjustment when unlocked or a fine adjustment when locked. After a rough adjustment has been made, the carriage is locked to the rod or shaft 172 and the fine adjustment made through manipulation of the assembly 174; this manipulation moves the rod 172 and due to the locking engagement of the carriage with the rod, the carriage is thus moved, and it is moved in micrometric movements, the interconnected relation between the spindle 222 and wire 158 always remaining.

The arrangement enables quick and accurate means for determining the accuracy of the dials for indicating the positions of the carriages relative to the starting point formed by the juncture of the guides 68 and 70. Reference to FIG. 3 shows these guides and the center punch 38 positioned in the corner against both guides. To check the accuracy of the dials, the center punch is lowered sufficiently for its cylindrical surface to engage the guides 68 and 70 and be moved into the corner in engagement with both of those guides. The diameter of the center punch is known and hence each dial, if accurately positioned, will indicate a distance equal to the radius of the center punch, this distance being such a distance from the respective coordinate guide. If, however, either or both of the dials do not indicate a distance which is exactly equal to the radius of the center punch, the respective wire 158 is adjusted longitudinally in the appropriate direction. This is accomplished by adjusting the means 264 (FIG. 11) in the manner indicated above, namely, loosening the one or the other of the set screws 274 or 276, and tightening the opposite one, until the intended indication is accurately registered in the dial and then tightening the other set screw. The adjustment thus accomplished moves the rod or shaft 242 bodily in the respective direction, and this movement, acting through the mounting blocks 234 (FIGS. 7 and 10) which in turn move the wire bodily, and the wire in so moving rotates the spindle 222 of the dial for correspondingly moving the indicating hand. It is to be noted that the portions of the wire coiling onto and uncoiling from the spindle do not produce any rubbing action on each other. Such tension or tautness of the wire is provided as to produce the desired friction with the spindle to eliminate any slippage, the tension or tautness of the wire being controlled by making the desired adjustments on the two segments of the rod 242*a* and 242*b*, as explained above.

The coil of the wire on the spindle may produce a tendency of the wire to creep up or down on the spindle as the spindle closely approaches the mounting blocks 234. To counteract or to eliminate this action, the adjusting means shown particularly in FIG. 7 is provided. This mounting means 224 may be manually gripped and turned in one direction or the other, which twists or untwists the wire about its longitudinal axis. The friction between the conical surface 228 of the mounting means and the inner surface 238 of the block is sufficient to retain the mounting means in its adjusted position, against all forces normally encountered in the operation of a device.

Figure 6:
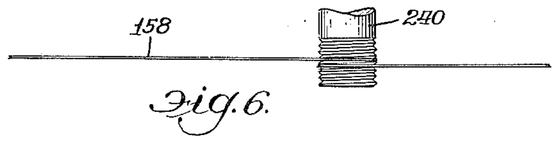
FIG. 6 is a fragmentary view of an alternate form of device relative to that shown in FIG. 5.

As mentioned briefly above, a screw threaded portion 240 of the spindle may be provided (FIG. 6) which confines the movements of the coiled portion of the wire, eliminating undue shifting or creeping of the wire up or down the spindle, but the pitch diameter of the threaded portion is more difficult to control or arrive at than the diameter of a cylindrical surface spindle, such as in FIG. 5, with the result that notwithstanding any tendency of the coil to creep in the use of the form of FIG. 5, the latter is preferred to that shown in FIG. 6, but it will be understood that the invention is sufficiently broad to cover both forms.

Attention is next directed to FIGS. 4, 26 and 27 in conjunction with the following description of a table extension utilized for accommodating workpieces longer than the bed 34. Such a table extension is shown at 360 which includes one unit. The extension is such that a plurality, and virtually an unlimited number, of such extensions or increments can be secured to the main device. The extension includes a plurality of rods 362, which in the present instance are four in number, and an intermediate rest 364 secured to the top of the upper pair of rods by a subsidiary plate 366 immediately below those rods and clamped to the rest 364 by cap screws 367. At their outer ends the rods are secured to a backstop 368 by suitable means such as cap screws 370. The rods at the inner ends are secured to the end surface of the table member 32 by means of studs 372 threaded in tapped holes in both the table member and the ends of the rods.

In the use of the table extension, the coordinate guide 70 is lowered to the position shown in FIG. 27, as referred to above. The intermediate rest 364 has a top surface 374 which in the proper assembly of the device is on a level with the bed 34 and the backstop 368 similarly has a top surface 376 lying in the same plane. A coordinate guide 378 similar in all material respects to guide 70 is mounted on the backstop 368 for movement to an upper position shown in FIG. 27 for engagement by a workpiece, and to a lower position similar to the position of the guide 70 in FIG. 27 whereby a workpiece may be placed over that coordinate guide (378) and extend farther out onto a second extension or increment. Legs 379 are provided for supporting the backstop 368 in the desired elevation.

When a workpiece is longer than the bed 34, and particularly when it is substantially longer and includes a multiple of the length of the bed 34, and furthermore when it is desired to make punches or markings in those areas of the workpiece beyond the dimension of the bed, the table extension 360 will accommodate such workpiece. The coordinate guide 70 is lowered to its lower position (FIG. 27) and the workpiece is extended or moved over the table extension until it engages the coordinate guide 378. The table extension 360 preferably is of the same effective dimension as the bed 34, i.e., the distance from the bed to the inner or facing surface of the coordinate guide 378 is exactly equal to the length of the bed 34 which in the present assumed instance is 20''. This dimension further facilitates coordination with the scale divisions on the dial 88, which are divided into ten divisions, each indicating an inch. When, for example, the first portion of the workpiece overlying the table and extending throughout the length of the bed, which would be 20'' in length, is marked, and it is desired to mark a successive portion of the workpiece, the workpiece is then extended or moved out over the extension table and butted against the coordinate guide 378 and the desired markings are then performed on the second portion.

The table extension 360 is such that it not only can be secured to the table member 32, but a plurality of such extensions may be provided and each beyond the first connected onto a previously mounted table extension. For example, in FIG. 27, rods **362*a* are shown connected to the back stop 368; instead of the bolts or cap screws 370 securing the backstop onto the rods 362, studs such as 372** may be utilized for securing the adjacent end of the second table extension thereto. It will be understood that the number of table extensions may be more than two, and may be limited only by space requirements or other considerations not involved in the present invention.

Figure 16:
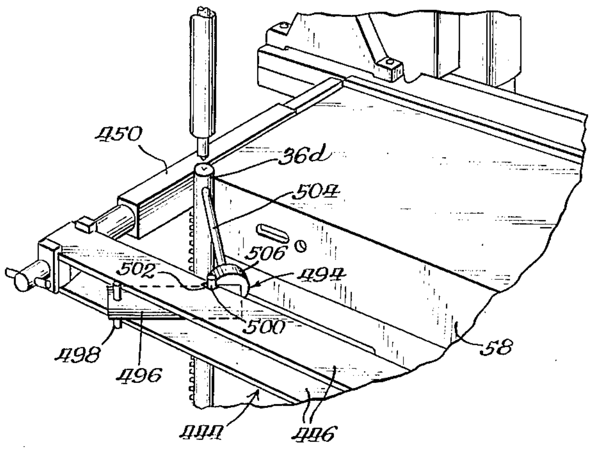
FIG. 16 is a perspective view of one corner of the device and illustrating a means for securing a round workpiece in a corner and in position for having a marking operation performed thereon.

The device of the invention includes another important feature and that is provision for mounting a workpiece on the device for making markings on surfaces thereof other than the flat sides thereof that would normally be disposed upwardly when the workpiece is lying flat on the bed 34, as for example on the edge surfaces thereof. Two examples of mounting workpieces for so marking them are illustrated in FIGS. 4 and 16. FIG. 4 shows to best advantage the attachments applied to the basic device for accommodating the workpieces in such positions.

Referring first to FIG. 4 a workpiece **36*c* is mounted and clamped in position with a narrow edge disposed upwardly and lying in a plane adjacent the plane of the bed 34. The workpiece 36*c* rests on a vertical support crossplate 380 on which the workpiece 36*c* is supported. This crossplate 380 is mounted for vertical adjustment for positioning the workpiece 36*c*, and any workpiece within the range of sizes permitted, in position with the intended edge surface in or adjacent the plane of the bed 34. The attachments including the crossplate 380 include a pair of vertical racks 382, one adjacent each corner of the front of the machine. These racks may be interconnected by a crosspiece 384 suitably secured to the stand 50 on adjacent elements thereof. The upper end of the racks 382 may be secured by butting them to the end surfaces of the table member 32 and securing them thereto by screws 385 (FIG. 25). The crossplate 380 is provided with notches 386 receiving the racks and closed on the front by blocks or plates 388. The crossplate and the blocks 388 together form apertures for journalling a shaft 390 having pinions 392 (FIGS. 22 and 23) thereon in mesh with the racks 382. The shaft is provided with a crank 394** for manual manipulation for rotating the shaft and working the pinions on the racks for raising and lowering the crossplate.

Clamp means 398 (FIGS. 4, 18, 22, 23 and 25) is provided for clamping the crossplate 380 in vertically adjusted position, one such clamp means being disposed at each end of the crossplate. Each clamp means includes a rack support block 400 having teeth 401 mounted for movement into and out of clamping position in which the teeth engage the associated rack. This sliding movement is controlled and guided by a key 402 (FIG. 23) fitted in a notch 404 in the crossplate 380 and secured therein as by a screw 402. The key also fits in a groove 408 formed in the block 400 and extending horizontally, the block thus riding over the key. The block is mounted on the inner end of a rod 410, the outer end of which is secured to, as by threading into, a hinge element 412 which may be generally cylindrical in form, pivotally mounted in the inner ends of a pair of inner or short clamp links 414. The other ends of the links 414 are pivotally mounted on the reduced ends 416 (FIG. 25) of a hinge member 418 which also may be cylindrical in shape and supports an operating handle 420, which includes a shank 422 projected through a transverse aperture 424 in the hinge member and threaded into a pin 426 secured in the links 414.

The reduced extensions 416 of the hinge member 418 also pivotally support the outer ends of a pair of outer or long clamp links 428, the inner ends of which are pivotally connected to elements 430 on the block 388 which in turn is secured to the crossplate 380 as described above (FIG. 4). Mounted in and between the outer clamp links 428, is a stop means 432 including a cutout central portion 434 traversed by a transverse piece 436 offset from the center of the stop element.

Figure 18:
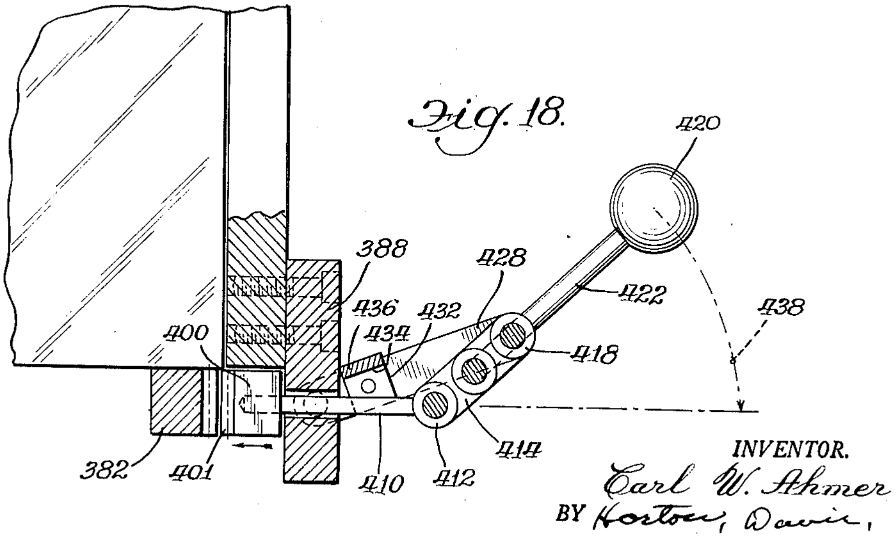
FIG. 18 is a plan view taken approximately on line 18—18 of FIG. 4.

In the operation of positioning the crossplate, each clamp means is moved to a released position shown in FIG. 18 and the crank 394 (FIG. 4) is operated to move the crossplate 380 to the desired vertical position, and then the clamp means are moved to clamped position shown in FIGS. 4 and 25. In moving the clamp means to released position the handle 430 is swung about the transverse pivot of the hinge member 418. This movement swings the inner clamp links 414 relatively outwardly, and the reaction is such that the inner ends of the links 414 remain relatively stationary while the hinge member 418 swings laterally together with the outer ends of the outer clamp links 428 which in turn swing about the pivot axis provided by the member 430. The pivotal action takes place between the links 414 and the member 412, which withdraws the pin 410, and thereby withdraws the block 400 from the rack 382. In moving the clamp means to clamping position, the handle is swung in the opposite direction, or in the direction of the arrow 438 in FIG. 18 and by movements in the reverse directions relative to those described above, the clamp block 400 is moved inwardly and into clamping engagement with the rack. Engagement of the piece 436 in the stop means 432 with the pin 410 limits the movements of the parts in clamping direction and stabilizes the clamp. Infinite degrees of adjustment of the crossplate 380 are not regarded as essential in view of the fact that the upper edge of the workpiece **36*c* need not be positioned exactly in the plane of the bed 34**, but may be displaced therefrom a substantial distance and still be reached by the center punch.

Clamp means is provided for positively clamping the means **36*c* in position, this workpiece being indicated at 442 as shown in FIGS. 4, 15, 24, 28 and 29. This clamp means is mounted and supported by a clamp bar 444 (FIG. 4) which is made up of a pair of vertically spaced elements 446, secured together at the ends by suitable means and spaced apart by spacer blocks 448. This bar 444 is secured to the table member 32 by a pair of supports 450, one at each end of the table member abutting the end surfaces of that member and secured thereto by suitable means such as quick releasee screw means 452 (FIG. 4) and other screws 453 (FIG. 25). The bar 444 may be secured to supports 450 by means of quick release screw means 454 (FIG. 4) including screw elements extending through the spacer blocks 448 and threaded into tapped holes in the supports 450**.

Referring now to the detailed construction of the clamp means 442, this means includes a central rod 456 (FIG. 28) which is adapted to directly engage the workpiece 36*c* at its inner end, and preferably having a knob 458 on its outer end. This rod 456 is freely slidable in a sleeve 460 which is secured at one end in a handle 462 by suitable means such as by threaded engagement, the handle having an aperture to so receive the sleeve and to accommodate the rod 456. The other end of the sleeve 460 is threaded at 464. The sleeve 460 is threaded into one of a pair of clamp end members 466 and 468. The member 466 is provided with a tapped transverse aperture to threadedly receive the threaded end of the sleeve 460 while the other member 468 is provided with a smaller transverse aperture for slidably receiving the rod 456. Each of the members 466, 468 is provided with reduced extensions 470 at each end, provided with interfacing flats 472 lying in planes extending longitudinally of the members. The members 466 and 468 are also provided with interfacing flats 474. Interposed between the end pieces 466, 468 is a pressure block 476 and a jam plate 478. The pressure block 476 has an aperture 480 slidably receiving the rod 456 while the jam plate 478 is provided with a central aperture 482 somewhat larger than the rod for enabling the jam plate to cant relative to the rod as explained hereinbelow. The pressure block 476 includes a back surface 484 perpendicular to the axis of the aperture 480 therethrough and a front surface 486 disposed at an angle to the back surface and to the axis of the aperture, while the jam plate 478 may be uniform, i.e., its opposite faces are both transverse to the central longitudinal axis. The pressure block 476 is provided with longitudinal apertures 488 at one side extending parallel with the axis of the central aperture in which pins 490 are freely slidable therein and engageable with the jam plate 478 and with the surface 474 on the adjacent clamp end member 466. A compression spring 492 is interposed between the jam plate 478 and the member 468. The clamp assembly finally includes a pair of links 494 having end apertures fitted over the reduced portions 470 of the clamp members and engaging the shoulders 495 formed by the main body portions of those ends. The assembly thus described is fitted in the space between the elements 446 making up the bar 444, and the dimensions and proportions are such that the flats 472 engage the outer and inner edges of both of these elements 446 and retain the assembly snugly in position in the bar 444 with the assembly and particularly the rod 456 in accurate alignment perpendicular with the front face 58 (FIG. 4) of the table member 32. The plates 494 are engaged by the side surfaces of the pressure block 476 and jam plate 478 and constrain them against rotation about the axis of the rod 456.

In the operation of the clamp means 442 the rod 458 is withdrawn or moved to a retracted position, i.e., the inner end of the rod is withdrawn from the surface 58 of the table member a distance sufficient to enable interposition of the workpiece 36*c*. After positioning the workpiece, the rod 456 is moved forwardly, as it can be done freely, until the inner end thereof engages the workpiece. The outer end of the rod 456 may be held by either hand and the handle 462 is then tightened up. In the retracted position of the pressure block (FIG. 15) where the block engages the surface 474 of the member 466, the pins 490 engage the surface 474 and when in such position are of such length that the jam plate 478 is disposed accurately transverse to the rod 456. This positions the aperture 482 therein in coaxial relation to enable free sliding of the rod 456. In this position the jam plate 478 at the side opposite the pins 490 engages the pressure block 476 at the thick end thereof (FIG. 15). Upon threading the sleeve 460 through the clamp end member 466, it engages the pressure block 476 and moves it forwardly, but the compression spring 492 forces the jam plate relatively rearwardly, i.e., prevents the one side of the jam plate from moving forwardly. This is accomplished by the fact that the pins 490 are held against forward movement and the corresponding side of the jam plate, bearing against the pins, is prevented from moving forwardly and the jam plate then assumes a cocked or inclined position shown in FIG. 29 in which it produces a binding action on the rod 456. The latter rod therefore is securely clamped in position and clamps the workpiece 36*c* in position. The movement of the parts in clamp releasing direction are corresponding and opposite in direction, with corresponding opposite function and result.

The clamp means 442 may be moved to any position along the length of the bar 444 to accommodate workpieces of various sizes. This clamp means thus enables secure clamping of the workpiece 36*c* at the front of the table member 32 in position with any of its edge surfaces disposed upwardly and in position for marking or punching operations. These positions for markings on the workpiece 36*c* are accurately determinable, particularly in view of the selected dimensions of the bed 34, as preferred and described above, namely, for example, the front to rear dimension of the bed may be 10″, with the extension 56 removed, and therefore the location of the desired marking on the workpiece as calculated from a side edge of that workpiece, may be easily calculated relative to the bed 34, and easily determined by observation of the dial 90.

Another feature of the invention is a clamp means for clamping a workpiece such as a round rod 36*d* as illustrated in FIG. 16. Such clamp means, designated 494, may include a clamp body 496 positoned between the elements 446 of the bar 444, and provided with a transverse pin 98 at an outer end and another transverse pin 500 at an inner end, the ends of the latter pin on opposite sides of the clamp body being fitted in notches 502 in the inner edges of the elements 446, i.e., the edges opposing the face 58 of the table member. A clamp rod 504 is threaded along its entire length and slidably engaged and guided in a plain hole in the clamp body, and its inner end is engageable with the workpiece 36*d*. A handwheel 506 is threaded on the outer end of the rod 504 and on turning the same, reacting against the clamp body, it forces the rod 504 into clamping engagement with the workpiece. The dimensions and proportions of the clamp means 494, together with the position of the notches 502 are such that the rod 504 accurately bisects the angle formed by the face 58 and the inner surface of the support 450. The device therefore is effective for clamping workpieces in any position for presenting any of six surfaces upwardly for performing a marking operation thereon. Moreover, nonpolygonal workpieces may be securely clamped in position, as the round rod forming the workpiece 36*d*. In view of the fact that clamp means, such as 494, may be infrequently used, this clamp means may be easily removed from the bar 444 by removing the pin 500 from the notches 502 and turning the clamp means to a position with the clamp rod 504 depending downwardly, and with the pin 498 disposed horizontally, and then withdrawing it inwardly from the space between the elements 446.

It is thought that the invention and its attendant advantages will be understood from the foregoing description, and it will be apparent that various changes may be made in the form, construction and arrangement of the parts without departing from the spirit and scope of the invention or sacrificing all of its material advantages, the form hereinbefore described and illustrated in the drawing being merely a preferred embodiment thereof.

I claim:

1. A device of the character disclosed comprising a bed forming a surface for supporting a workpiece, a cylindrical marking tool having a pointed center punch, means mounting the marking tool in vertical position with the center punch disposed downwardly and for vertical adjustment for positioning it selectively above and adjacent to a workpiece on the bed, means yieldingly and resiliently supporting the center punch in an upper retracted position, a manually actuatable striker above the center punch operative on actuation thereof for driving the center punch down into punching engagement with a workpiece on the bed, and means for releasably retaining the striker in its upper retracted position, said retaining means including an element operable on manual manipulation thereof for raising the striker to its upper retracted position and retaining it there when released, and being operable in response to further raising the striker for releasing the striker enabling the latter to fall below its upper retracted position when dropped.

2. A device of the character disclosed comprising a bed for supporting a workpiece, a vertically disposed marking tool including a sleeve, a center punch in the lower portion of the sleeve projecting through the lower end thereof, spring means yieldingly and resiliently retaining the center punch in an upper retracted position, a striker above the center punch including a shaft reciprocable in the sleeve and having a hand grip on its upper end above the sleeve, the striker being capable of being manually lifted and dropped for driving the center punch downwardly into marking engagement with a workpiece therebelow, means mounting the marking tool over the bed for vertically adjustable positioning thereof into proximity to a workpiece therebelow and on the bed, the mounting means also providing movement of the marking tool over the bed along opposite coordinates, and means for releasably retaining the striker in its upper retracted position, said retaining means including an element operable on manual manipulation thereof for raising the striker to its upper retracted position and retaining it there when released, and being operable in response to further raising the striker for releasing the striker enabling the latter to fall below its upper retracted position when dropped.

3. A marking tool comprising a sleeve, a center punch mounted in a lower end of the sleeve with its punch end projected downwardly out of the sleeve and reciprocable between an upper retracted position and a lower projected position, spring means biasing the center punch to upper retracted position, a striker having a shaft reciprocable in the upper portion of the sleeve and engageable through its inner end with the center punch and having a hand grip above the sleeve for grasping by the hand for lifting it for letting it drop to strike the center punch and driving the latter in projected direction, the striker being independently mounted for falling solely under the influence of gravity.

4. The invention set out in claim 3 wherein means is mounted on the sleeve for vertical movement and operative in response to being raised for raising the striker and upon release thereof to retain the striker in raised position, and operative in response to the striker being raised above its said raised position for falling from its retaining position and enabling the striker upon being released to fall below its said raised position.

5. A marking tool comprising a vertical sleeve, a center punch slidably mounted in the lower end of the sleeve and having a pointed end projected below the sleeve, means biasing the center punch upwardly, a striker having a shaft in the sleeve and adapted to engage the upper end of the center punch, the striker having a handle thereon forming a downwardly facing shoulder opposed to the upper end surface of the sleeve, and a retractor means for raising the striker and releasably retaining it in raised position, said retractor means including a lever having legs straddling the sleeve and pivoted on the sleeve at their extended ends, the swinging end of the lever having a finger grip portion, a retractor arm having legs straddling the axis of said spindle and pivotally connected to the legs of the lever on a transverse axis intermediate the length of the legs on the lever, said retractor arm including a crosspiece having L-shaped elements including a generally vertical element and a top lateral element, the legs of the retractor arm being of such length that the top lateral element remains within the periphery of the body of the striker in all positions of the arm and is operative for raising the striker upon raising movement of the lever, and the weight of the striker bearing on the lateral element swinging the retractor arm about the axis of its connection with the lever in such direction that the lower edge of the vertical element of the L-shaped member engages over the upper edge of the sleeve and the retractor lever remains in such position, upon releasing the lever, due to the weight of the striker, and upon raising of the striker the weight of the lever produces a toggle action for projecting the vertical element of the L-shaped member horizontally beyond the periphery of the sleeve and enables the lever and arm together to lower whereupon the horizontal element of the L-shaped member engages on the upper edge of the sleeve, said striker being operative upon being dropped for engaging the center punch and driving the latter downwardly before a marking tool comprising a vertical sleeve.

6. A marking tool comprising a vertical sleeve, a center punch slidably mounted in the lower end portion of the sleeve and having a punch end projected below the sleeve, means biasing the center punch upwardly, a striker having a shaft portion slidably mounted in the sleeve and adapted to engage the center punch upon lowering of the striker, the striker having a body portion at its upper end of greater dimension than the shaft, and retractor means for raising the striker and releasably retaining it in raised position comprising a lever pivoted on the sleeve, an arm pivoted on the lever and having a portion between the striker body and the sleeve in all positions of the striker and lever and arm, the connections between the lever and arm being such that upon raising movements of the lever, the arm engages the striker body and raises the striker, and the arm moves into the space between the striker body and sleeve and retains the striker in elevated position, and upon raising the striker beyond said elevated position the weight of the lever forces the lever and the arm to lowered position with a portion of the arm remaining between the sleeve and striker body in the lowermost position of the striker.

7. In a device of the character disclosed, a stand, means on the stand for forming a bed, a marking tool, a carriage mounting the marking tool for movement over the bed, and means mounting the carriage including a first arm extending along a side of the bed, said first arm having a longitudinal groove on each of diagonally opposite corners, each groove having a horizontal and a vertical bearing surface, a cantilever arm directly supporting the carriage, bearing means supporting the cantilever arm at one end on the first arm, one such bearing means being in register with each groove in the arm, each bearing means having a race, each race having a horizontal and a vertical bearing surface opposing corresponding surfaces in the grooves, at least a portion of each race being straight, and a plurality of free balls in the race, the bearing means being so disposed relative to the grooves in the arm that the bearing balls in at least the straight part of the race engage both bearing surfaces in the grooves in the arm and in the race, and the parts being so relatively dimensioned and proportioned for preloading those balls so engaging those surfaces.

8. Means for supporting a member for movement along an axis and restraining it against rotating about that axis due to a load carried by the member disposed laterally of said axis and tending to produce a turning moment about the axis, comprising an arm extending along said axis and having a longitudinal groove along each of diagonally opposite corners, each of which has a horizontal and a vertical bearing surface, a carriage, a bearing means mounted on the carriage in register with each groove, each bearing means having a race at least a portion of which is straight and defined by a horizontal and a vertical bearing surface, a plurality of free balls in the race, the parts being so positioned that the straight portions of the races are in register with respective grooves in the arm and the balls in said straight portions engage both said surfaces of both the straight portions of the races and the grooves, and the parts being so relatively dimensioned and proportioned for preloading those balls in said straight portions of the races.

9. The invention set out in claim 8 wherein the corners of the arm in which the grooves are formed are the upper proximate and lower remote relative to the direction of the lateral position of the load.

10. A device of the character disclosed comprising a stand, a table member on the stand having a top surface defining a bed for supporting a workpiece, the bed having side edges defining coordinates of the area of the bed, a marking tool, means mounting the marking tool for moving it to any position over the bed including a zero position relative to both said coordinates, means for visually indicating the position of the marking tool relative to said coordinates independently of visual relation of the marking tool itself to a fixed element of the bed, and table extension means including means for detachably securing it to the table member at an end thereof and having rest means with a top surface for supporting a workpiece, and means for supporting the rest in such elevation to dispose its top surface flush with the bed of the table member, and abutment means defining a length of the table extension which constitutes a predetermined length relative to the length of the bed in the direction of the extension.

11. The invention set out in claim 10 wherein the table member is provided with a coordinate guide on the side thereof to which the table extension is secured, said coordinate guide being selectively adjustable to a position above the bed whereby to be engaged by a workpiece on the bed and limiting its position in that direction, and a lower position in which it is at least as low as the bed, and the table extension has a coordinate guide at its extended end extending above the top surface of the rest means for engagement by a workpiece resting on the bed and table extension and limiting the extent to which the workpiece is moved in the direction of the table extension.

12. The invention set out in claim 11 wherein the coordinate guide on the table extension is positionable in its position extending above the top surface of the rest means and a lower position at least as low as said top surface whereby a plurality of such table extensions may be secured together in serial relation extending from the table member outwardly whereby to enable all of the coordinate guides on the table extensions other than the outermost one to be moved to their lower position to enable a workpiece to rest on said top surfaces of the rest means and the outermost coordinate guide may be raised to its raised position for engagement by a workpiece supported on the bed and table extensions.

13. A device of the character disclosed comprising a stand, means on the stand forming a bed for supporting a workpiece, coordinate guide means at side edges of the bed forming abutment means for locating a workpiece in predetermined position on the bed, a marking tool, means mounting the marking tool for movement over the bed in any direction thereover and adapted upon actuation thereof for producing a mark on a workpiece supported on the bed, means for visually indicating the position of the marking tool relative to said coordinates independently of visual relation of the marking tool itself to a fixed element of the bed, said bed having a front vertical surface for engagement by a workpiece, clamp means detachably mounted on the stand at the front thereof and having a clamp engageable with a workpiece supported against said vertical surface, and means supporting a workpiece vertically in such position engaging said vertical surface, said marking tool having a range of movement at least in forward direction beyond said bed whereby to enable positioning of the work tool over a workpiece so supported against said vertical surface for performing a marking operation thereon.

14. The invention set out in claim 13 wherein the means for supporting the workpiece is vertically adjustable whereby to enable positioning of the upper surface of the workpiece when supported thereon and against said vertical surface in position adjacent the plane of said bed.

15. The invention set out in claim 14 wherein the means for adjusting said support includes rack means supported on the stand and pinions in the support, and means is provided for manually rotating the pinions which acting through the rack means produce vertical movements of the support, and further wherein clamp means is provided for clamping the support in vertically adjusted position.

16. The invention set out in claim 13 wherein the clamp means includes a bar extending transversely of the bed and spaced forwardly thereof and the clamp is mounted in said bar and reacts between said bar and the workpiece in its function of clamping the workpiece against said vertical surface.

17. The invention set out in claim 13 in combination with a bed extension having a vertical surface arranged for butting the vertical surface of the bed of the table member and including means for securing the extension to the table member, and having a top surface which, when the extension is secured to the table member, is flush with the bed, whereby the bed extension forms a continuation of the bed in forward direction, said bed extension being detachably mounted thereon whereby to enable alternative arrangements for supporting on the extension workpieces of greater dimension than the front-to-rear dimension of the bed, and workpieces butted to and secured against said vertical surface of the table member.

18. The invention set out in claim 15 wherein the clamp means includes clamp blocks having teeth adapted to mesh with said rack, and includes toggle means for movement of the clamp blocks into and out of meshing engagement with the rack means for positively locking the support in adjusted position.

19. The invention set out in claim 16 wherein the means for supporting said transverse bar includes elements extending forwardly from the table member, and one of said elements forms with said vertical surface of the table member a right angle corner for abutment of a workpiece against each surface forming the angle, and the clamp and transverse bar have inter-engaging elements positioning the clamp in a direction bisecting said angle whereby to enable a single said clamp to clamp a workpiece in the corner formed by said two surfaces, such as a round workpiece.

20. The invention set out in claim 19 wherein the transverse bar is composed of a pair of vertically spaced elements and the clamp includes a portion disposed between said elements and the clamp and the vertically spaced elements of the bar have interengaging portions on the outer and inner edge surfaces of the elements, relative to the front and rear directions of the device, and the inner edge surfaces of the elements further are provided with notches at a predetermined location, receiving elements of the clamp, whereby to locate the clamp for bisecting said angle and to provide balanced reactions between the clamp and elements of the transverse bar in the action of clamping a workpiece in said corner formed by said angle.

21. A device of the character disclosed comprising a stand, means on the stand forming a bed for supporting a workpiece, a coordinate guide at each of two edges of the bed, at least one of which is vertically adjustable, engageable by a workpiece on the bed for determining respective zero positions relative to respective opposite coordinates for determining locations on the workpiece, a marking tool, means mounting the marking tool for movement by direct manual force over the bed along each of said coordinates, means for adjusting the marking tool in micrometric increments in each of the directions of the coordinates, said adjusting means being fixed relative to the direction of movement of the marking tool produced thereby, whereby to facilitate accurate positioning of the marking tool relative to a position thereof produced by direct manual force thereon, the marking tool being manually manipulable for producing a mark on a workpiece disposed on the bed in alocation thereon corresponding to the position of the marking tool relative to the bed as determined by reference to said zero position, and means for visually indicating such position of the marking tool independently of the visual relation of the marking tool to a fixed element of the bed, said indicating means including relatively fixed and movable cooperating elements, and means interconnecting said movable element and a part of the device that is fixed relative to movement of the marking tool whereby to move said movable element directly in proportion to movement of the marking tool relative to the bed.

22. A device of the character disclosed comprising a stand, means on the stand forming a bed for supporting a workpiece, a coordinate guide at each of two edges of the bed engageable by a workpiece on the bed for determining zero positions relative to respective opposite coordinates for determining locations on the workpiece, a marking tool, movable carriage means mounting the marking tool for movement over the bed, manually actuated means for releasably locking the carriage in any position to which it is moved, said manually actuated means including an element normally fixed but adjustable relative to the bed, and manually actuated means for adjusting said last element and thus the carriage means when it is locked thereto relative to the bed in any given position of the carriage means relative to the bed to which it is moved when unlocked from said last element.

23. A device of the character disclosed comprising a stand, means on the stand forming a bed for supporting a workpiece, a first carriage, a first arm mounting the carriage for movement therealong and along a first coordinate of the bed area, a rod on said arm and extending longitudinally therealong, locking means in the carriage cooperable with said rod for releasably locking the carriage in any selected position along the arm, means for manually adjusting said rod longitudinally for correspondingly adjusting the carriage when it is locked to the rod, stop means at an end of said arm representing a zero point on said coordinate, means yieldingly retaining said stop means in position for limiting movement of the carriage to a zero position, a second arm secured at one end to said first carriage and extending transversely of the first arm along a second coordinate of the bed area, a second rod on said second arm and extending longitudinally therealong, locking means in the second carriage cooperable with the second rod for releasably locking the second carriage in any selected position along the record arm, means for manually adjusting the second rod longitudinally for correspondingly adjusting the second carriage when it is locked to the rod, second stop means at an end of the second arm representing a zero point on the second coordinate, means yieldingly retaining said second stop means in position for limiting movement of the second carriage to a zero position, and a marking tool carried by the second carriage and, due to movements of the two carriages, being universally movable over the bed and assuming a zero position in both directions at a corner of the bed when both carriages are in their said zero positions.

24. The invention set out in claim 22 wherein said coordinate guides are releasably positionable in an upper position for engagement by the workpiece and a lower position at least as low as the bed whereby to enable a workpiece on the bed to project beyond the edges thereof on which the guides are mounted.

25. The invention set out in claim 24 wherein said marking tool has a center point, and having a cylindrical surface engageable with the coordinate guides whereby to determine the accuracy of the indicating means by comparison with the diameter of the marking tool.

26. In a device having a bed, and carriage means movable along a rectilinear axis over the bed, the combination of a spindle member mounted for rotation about an axis normal to said rectilinear axis, a pair of spaced mounting means each having rotatable fitting means, a single wire member extending between said mounting means, substantially parallel to said rectilinear axis and having its opposite ends fixedly secured to said fitting means; said wire member having an intermediate portion coiled about the exterior of said spindle member in frictional driving engagement therewith; means for adjustably tensioning said wire between said mounting means, and means for rotatably moving each said fitting means to adjustably twist said wire member about its longitudinal axis; one of the members, constituting said spindle and wire, being stationary with respect to the other and said other thereof being movable with the carriage means to effect relative movement of said members with movement of said carriage means whereby said relative movement serves to rotatably drive said spindle member in proportion to the linear displacement of said carriage means along said rectilinear axis; and means operatively responsive to rotation of said spindle means for visually indicating the extent of said linear displacement from a reference position.

References Cited by the Examiner

UNITED STATES PATENTS

| | | | |
|---|---|---|---|
| 1,283,192 | 10/1918 | Hughes | 269—167 |
| 1,370,645 | 3/1921 | Hawkes | 33—189 |
| 1,615,668 | 1/1927 | Anderson | 33—189 |
| 2,075,282 | 3/1937 | Hedgpeth. | |
| 2,293,732 | 8/1942 | Guttmann | 33—189 |
| 2,353,726 | 7/1944 | Guttmann | 33—189 |
| 2,498,870 | 2/1950 | Armitage et al. | 74—441 |
| 2,526,987 | 10/1950 | Wilson | 269—303 X |
| 2,576,485 | 11/1951 | Schwandt | 77—63 X |
| 2,615,348 | 10/1952 | Gasser | 74—441 |
| 2,618,860 | 11/1952 | Engelhart | 33—189 |
| 2,708,972 | 5/1955 | Park | 33—191 |
| 2,735,323 | 2/1956 | Philips | 269—167 |
| 3,008,774 | 11/1961 | Morris et al. | 308—3 |

FOREIGN PATENTS

| | | |
|---|---|---|
| 663,126 | 7/1938 | Germany. |
| 557,069 | 11/1943 | Great Britain. |

ISAAC LISANN, *Primary Examiner.*

UNITED STATES PATENT OFFICE
CERTIFICATE OF CORRECTION

Patent No. 3,239,941 March 15, 1966

Carl W. Ahmer

It is hereby certified that error appears in the above numbered patent requiring correction and that the said Letters Patent should read as corrected below.

Column 6, line 50, for "about" read -- abut --; line 52, for "permenant" read -- permanent --; line 53, for "bearing" read -- bearings --; lines 70 and 71, for "detain" read -- detail --; column 7, line 25, for "conventiently" read -- conveniently --; column 8, line 22, after "threaded" insert -- in a threaded --; column 9, line 34, for "block" read -- blocks --; line 34, for "noramlly" read -- normally --; line 55, for "realtively" read -- relatively --; column 16, line 70, for "releasee" read -- release --; column 23, line 9, for "alocation" read -- a location --.

Signed and sealed this 24th day of January 1967.

(SEAL)

Attest:

ERNEST W. SWIDER
Attesting Officer

EDWARD J. BRENNER
Commissioner of Patents